US006975326B2

(12) United States Patent
Baumberg et al.

(10) Patent No.: US 6,975,326 B2
(45) Date of Patent: Dec. 13, 2005

(54) IMAGE PROCESSING APPARATUS

(75) Inventors: Adam Michael Baumberg, Berkshire (GB); Alexander Ralph Lyons, Berkshire (GB)

(73) Assignee: Canon Europa N.V., Amstelveen (NL)

( * ) Notice: Subject to any disclaimer, the term of this patent is extended or adjusted under 35 U.S.C. 154(b) by 312 days.

(21) Appl. No.: 10/287,617

(22) Filed: Nov. 5, 2002

(65) Prior Publication Data

US 2003/0085890 A1    May 8, 2003

(30) Foreign Application Priority Data

Nov. 5, 2001 (GB) .................................. 0126528

(51) Int. Cl.⁷ ............................................. G06T 15/00
(52) U.S. Cl. .................................................... 345/582
(58) Field of Search ........................ 345/582, 423–425, 345/430, 435, 437, 442; 382/268, 271, 272, 382/275, 285

(56) References Cited

U.S. PATENT DOCUMENTS

| 5,706,419 | A  | * | 1/1998  | Matsugu et al. ............. 345/420 |
| 6,081,273 | A  |   | 6/2000  | Weng et al. .................. 345/425 |
| 6,281,904 | B1 |   | 8/2001  | Reinhardt et al. ........... 345/430 |
| 6,356,272 | B1 | * | 3/2002  | Matsumoto et al. ........ 345/582 |
| 6,621,921 | B1 | * | 9/2003  | Matsugu et al. ............. 382/154 |
| 6,640,004 | B2 | * | 10/2003 | Katayama et al. .......... 382/154 |
| 6,823,080 | B2 | * | 11/2004 | Iijima et al. ................. 382/154 |
| 2001/0056308 | A1 |   | 12/2001 | Petrov et al. .................. 700/98 |
| 2002/0050988 | A1 |   | 5/2002  | Petrov et al. ................ 345/418 |
| 2002/0085748 | A1 |   | 7/2002  | Baumberg .................... 382/154 |
| 2002/0186216 | A1 |   | 12/2002 | Baumberg et al. .......... 345/422 |
| 2002/0190982 | A1 |   | 12/2002 | Kotcheff et al. ............. 345/420 |
| 2003/0001837 | A1 |   | 1/2003  | Baumberg .................... 345/419 |

FOREIGN PATENT DOCUMENTS

| EP | 0898245 A1 | 2/1999 | ............ G06T 7/00 |
| GB | 2358307 A | 7/2001 | ............ G06T 7/00 |
| GB | 2369260 A | 5/2002 | ........... H04N 5/262 |
| GB | 2369541 A | 5/2002 | ............ G06T 15/20 |
| JP | 9-170914 | 6/1997 | ........... G01B 11/24 |
| JP | 11-328441 A | 11/1999 | |
| JP | 2000-163590 | 6/2000 | |
| JP | 2000-268189 A | 9/2000 | ............ G06F 15/00 |
| JP | 2000-339499 | 12/2000 | |
| WO | WO 98/18117 | 4/1998 | |
| WO | WO 00/04506 | 1/2000 | ............ G06T 17/00 |
| WO | WO 01/39124 A2 | 5/2001 | ............ G06T 7/00 |

OTHER PUBLICATIONS

Martin Lohlein, "A Volumetric Intersection Algorithm for 3d-Reconstruction Using a Boundary-Representation", http://i31www.ira.uka.de/diplomarbeiten/da_martin_loehlein/Reconstruction.html.

M. Szilvasi-Nagy, "An Algorithm for Determining the Intersection of Two Simple Polyhedra", Computer Graphics Forum 3 (1984), pp. 219-225.

(Continued)

Primary Examiner—Almis R. Jankus
(74) Attorney, Agent, or Firm—Fitzpatrick, Cella, Harper & Scinto

(57) ABSTRACT

To generate texture data for a 3D computer model 150 of a real-life object 210, images 300–316 of the subject object are recorded from different viewing positions and directions. The image data is processed by an image processing apparatus 2 to register the viewing positions and directions of the images 300–316 based on the positions of features in the images. The 3D computer model 150 of the subject object is registered with the resulting registered set of images, and texture data is generated for the 3D computer model from the images.

38 Claims, 16 Drawing Sheets

OTHER PUBLICATIONS

Wolfgang Niem, "Automatic reconstruction of 3D objects using a mobile camera", Image and Vision Computing 17, (1999), pp. 125-134.

R. I. Hartley, "Euclidean Reconstruction From Uncalibrated Views", Applications of Invariance in Computer Vision, Mundy, Zisserman and Forsyth eds., Azores 1993, pp. 237-256.

J. Illingworth & A. Hilton, "Looking to build a model world-automatic construction of static object models using computer vision", Electronics & Communication Engineering Journal, Jun. 1998, pp. 103-113.

Steven J. Gortler et al., "The Lumigraph", Computer Graphics Proceedings, Annual Conf. Series, 1996 ACM-0-89791-746-4/96/008, pp. 43-52.

Peter J. Neugebauer & Konrad Klein, "Texturing 3D Models of Real World Objects from Multiple Unregistered Photographic Views", EUROGRAPHICS '99, vol. 18 (1999), No. 3.

Greg Turk & Marc Levoy, "Zippered Polygon Meshes from Range Images", Computer Graphics Proceedings, Annual Conference Series, 1994, ACM SIGGRAPH, pp. 311-318, ISBN 0-89791-667-0.

J. D. Foley et al., "Computer Graphics Principles and Practice", Addison-Wesley Pub. Co., Second Ed., Section 16.3.2, pp. 741-744 (1997).

P. J. Sloan et al., "Importance Driven Texture Coordinate Optimization", Eurographics '98, vol. 17, No. 3 (1998).

* cited by examiner

IMAGE PROCESSING APPARATUS

The present invention relates to the field of three-dimensional (3D) computer modelling of real-life objects, and more particularly to the generation of texture data for such a 3D computer model.

Many methods are known for generating an accurate 3D computer model of a real-life object. These include laser scanning the object, using a 3D touch sensing probe to determine the 3D positions of points on the surface of the object, and using a computer-aided design (CAD) system to model the object based on accurate measurement details (or alternatively, the real-life object may itself have been generated from the CAD model).

Although these methods generate a 3D computer model which accurately models the geometry of the surface of the subject object, they do not produce texture data for the computer model, which must be generated from images of the real-life subject object.

A further problem arises because the positions and orientations of the images must be accurately defined relative to the 3D computer model in order to generate the texture data—that is, each image must be accurately registered with the surface geometry defined by the 3D computer model.

To address the problem, it is known to provide a camera mounted in the same housing as a laser scanner for movement therewith. Surface geometry data is gathered by the laser scanner and image data is gathered by the camera as the scanner is moved to scan the subject object. Because the camera does not move relative to the laser scanner during the scanning process, the registration of the image data with the generated surface geometry data can be calculated.

This solution is expensive, however, requiring a dedicated camera within the laser scanning system. Further, it does not address the problem of how to generate texture data for 3D computer models generated using methods other than laser scanning.

The present invention aims to address one or more of the problems above.

According to the present invention, texture data is generated for a 3D computer model of a real-life subject object by recording images of the subject object from different viewing positions and directions, processing the image data to register the viewing positions and directions of the images based on the positions of features in the images, registering the 3D computer model of the subject object with the registered images on the basis that the images show the same subject object as that represented by the 3D computer model, and generating texture data from the registered images.

By calculating the viewing positions and directions of the images using image processing, the images may be recorded and processed independently of the processing to generate the 3D computer model.

By registering the images and then registering the 3D computer model with registered images, it is not necessary to register each image with the 3D computer model on an individual basis.

The subject object may be imaged together with a calibration pattern, and the images may be registered based on the positions of the features of the calibration pattern in the images.

In addition, or instead, the images may be registered based on the positions in the images of features on the subject object itself matched between the images.

The registration of the 3D computer model with the registered images may be carried out by changing the alignment of the 3D computer model and the set of images until the silhouette of the 3D computer model aligns with the silhouette of the subject object in at least some images.

The registration of the 3D computer model with the registered images may be carried out by generating a second 3D computer model of the subject object registered with the images, and registering the two 3D computer models.

The registration of the 3D computer model with the registered images may be carried out in accordance with user input signals or may be carried out automatically.

The present invention also provides a processing apparatus and method for use in generating texture data as set out above, in which images of a subject object are registered using an image processing technique, the registered images are registered with a 3D computer model of the subject object, and texture data for the 3D computer model is generated from the images.

The present invention also provides a computer program product, for example as embodied as a storage device or signal carrying instructions, for causing a programmable processing apparatus to become configured as such an apparatus or to become operable to perform such a method.

Embodiments of the invention will now be described, by way of example only, with reference to the accompanying drawings, in which like reference numbers are used to designate like parts, and in which:

FIG. 1 schematically shows the components of a first embodiment of the invention, together with the notional functional processing units into which the processing apparatus component may be thought of as being configured when programmed by programming instructions;

Figure 12A:
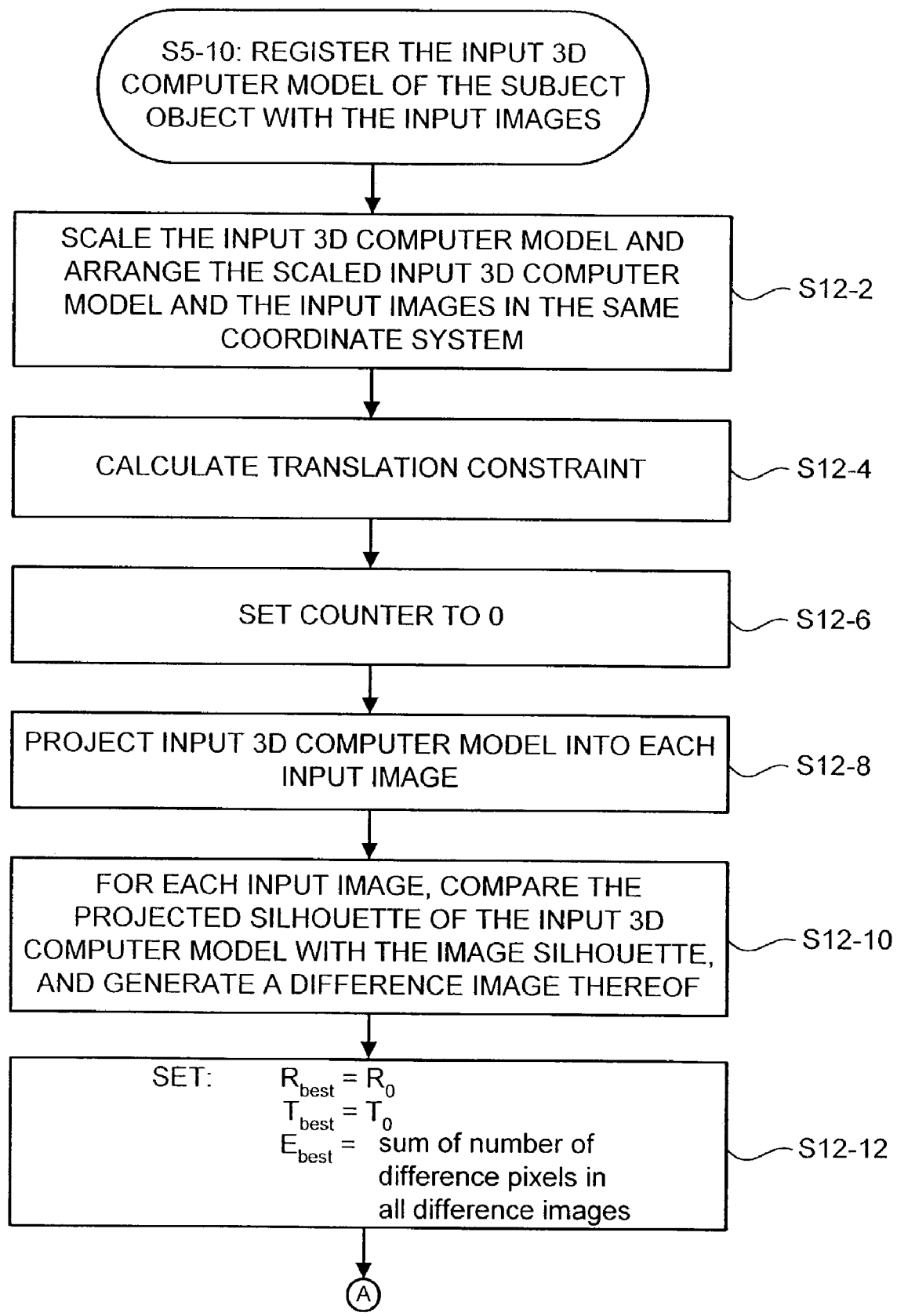
Figure 12B:
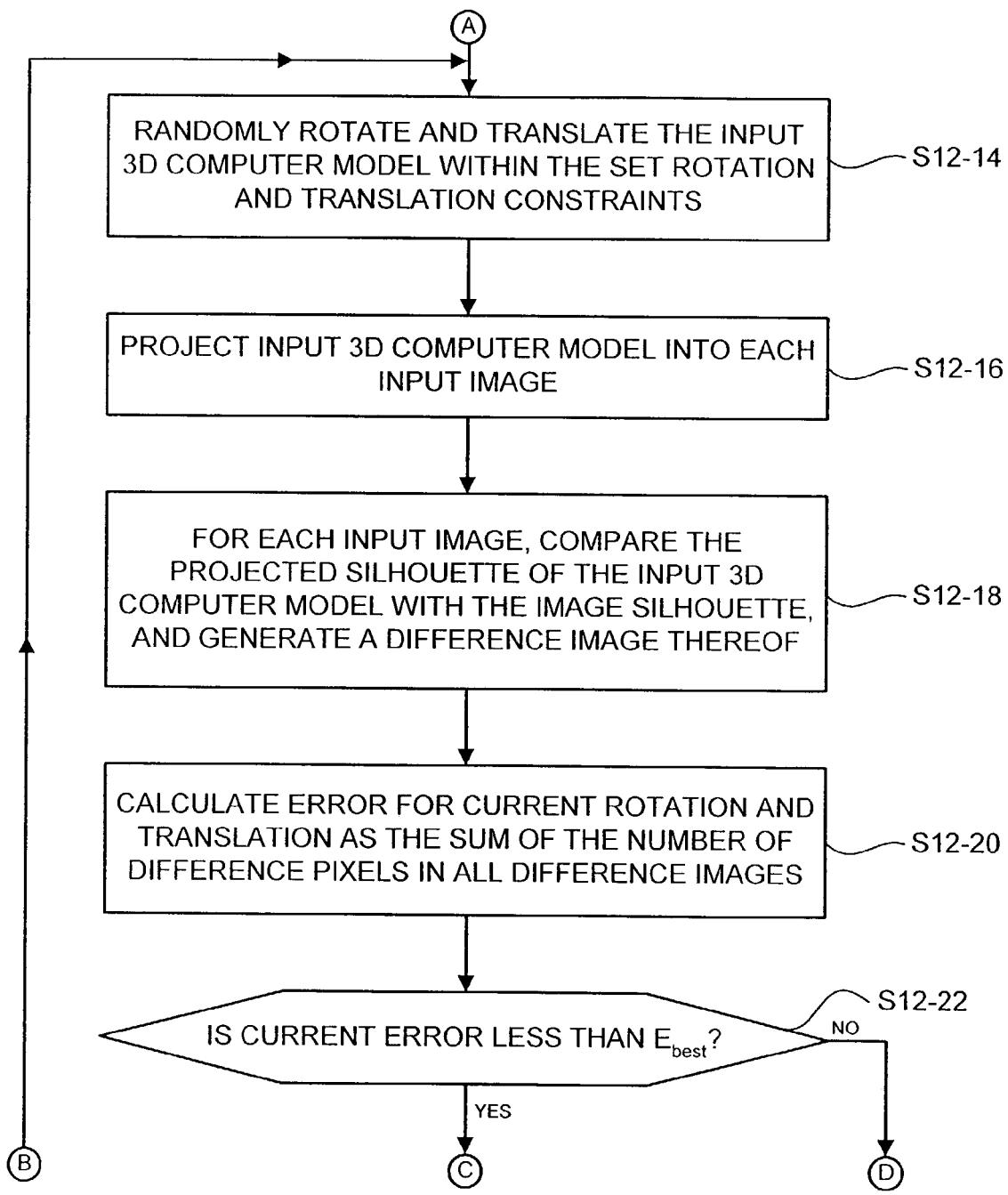
Figure 12C:
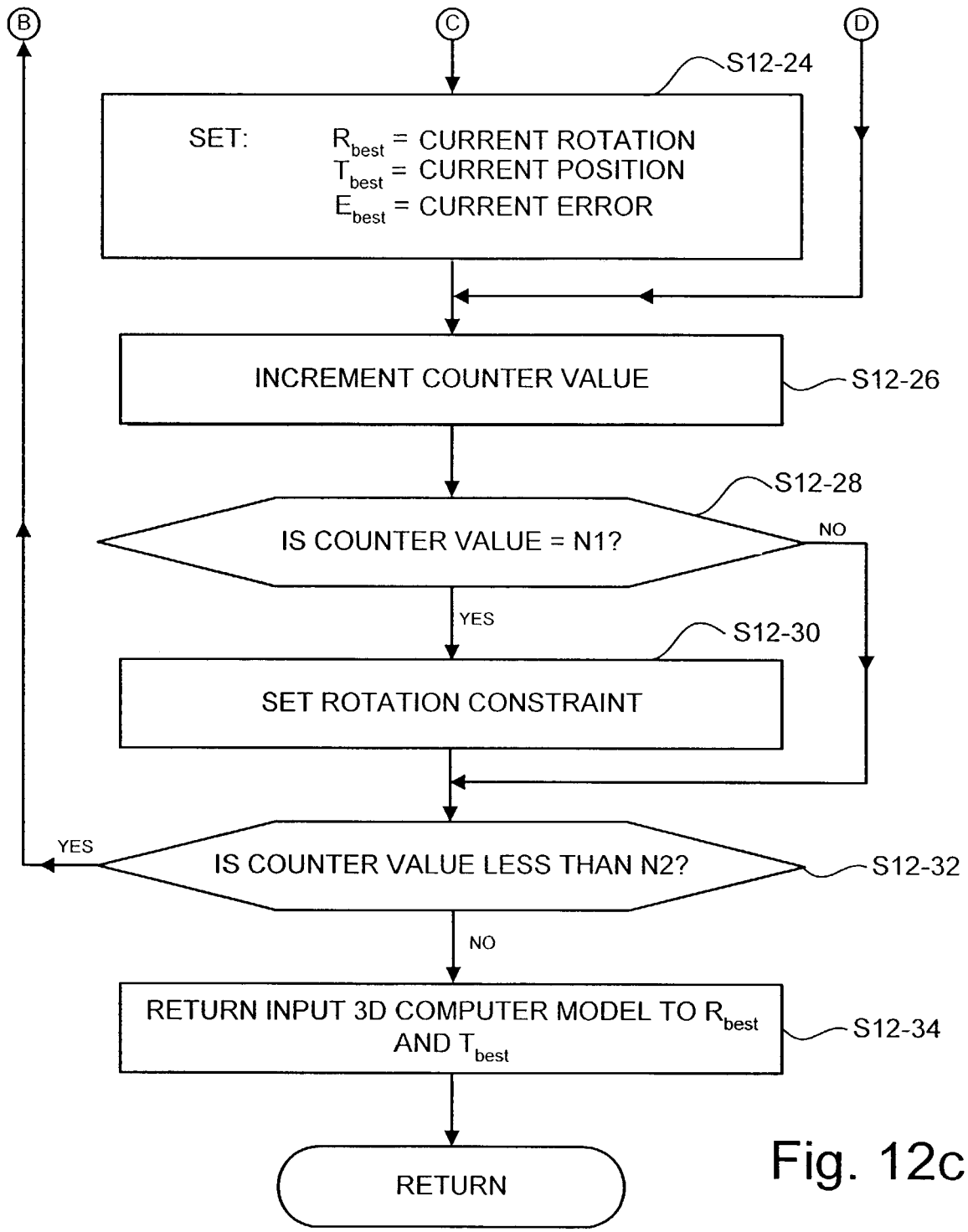
Figure 13:
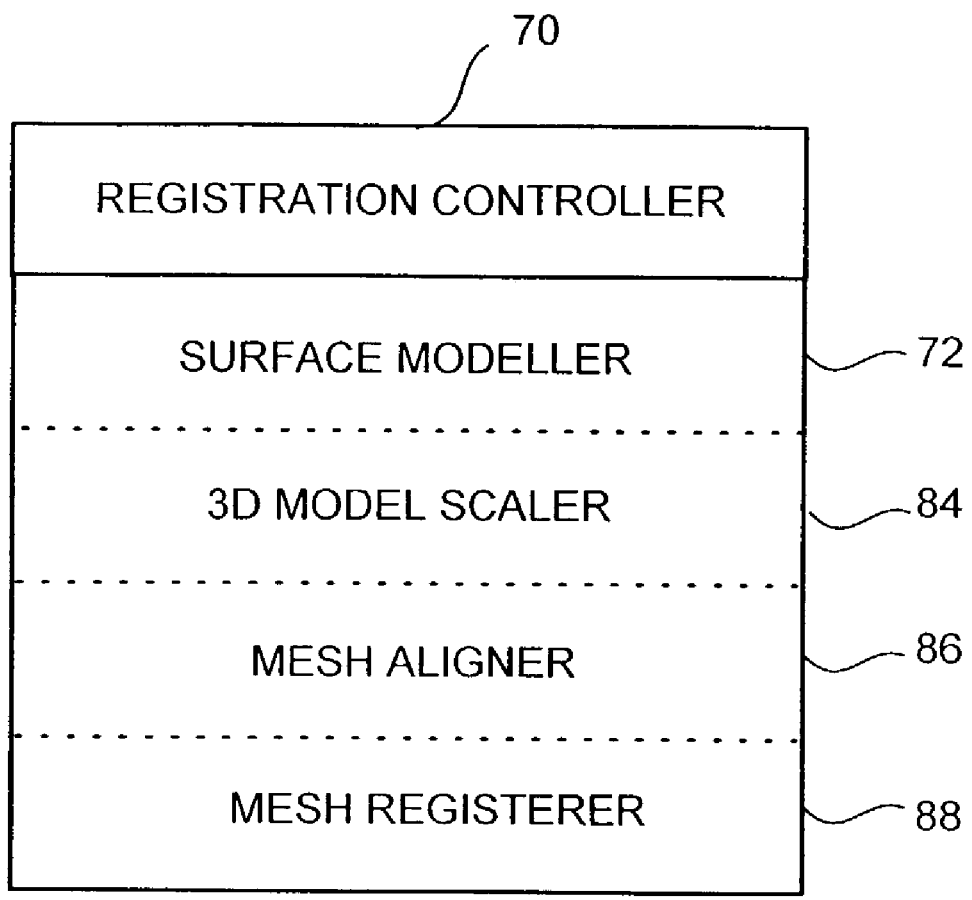
Figure 14:
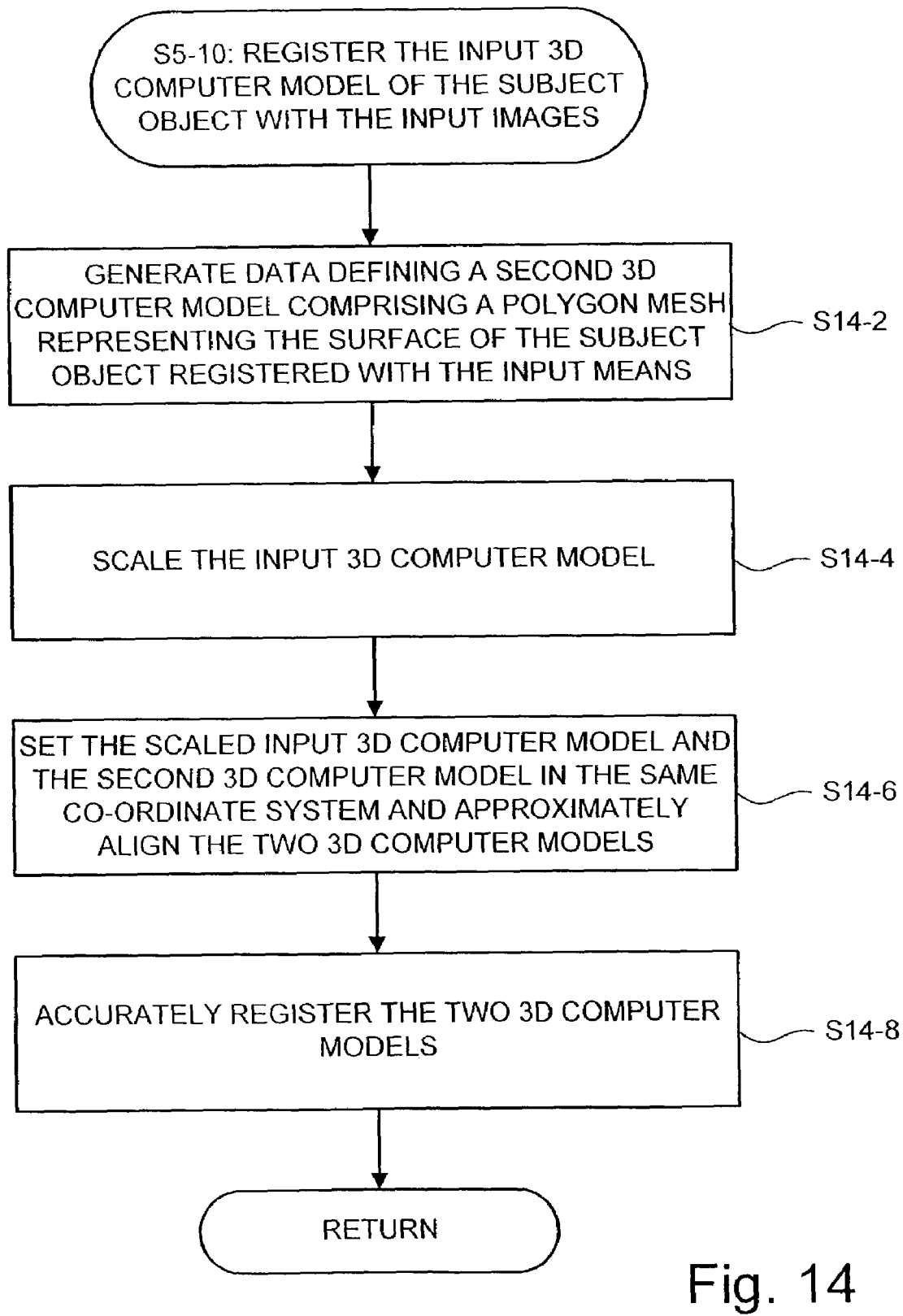

FIG. 12, comprising FIGS. 12a, 12b and 12c, shows the processing operations performed at step S5-10 in the third embodiment to register the input 3D computer model of the subject object with the input images;

FIG. 13 shows the functional components of the registration controller from the processing apparatus in a fourth embodiment; and FIG. 14 shows the processing operations performed at step S5-10 in the fourth embodiment to register the input 3D computer model of the subject object with the input images.

FIRST EMBODIMENT

Figure 1:
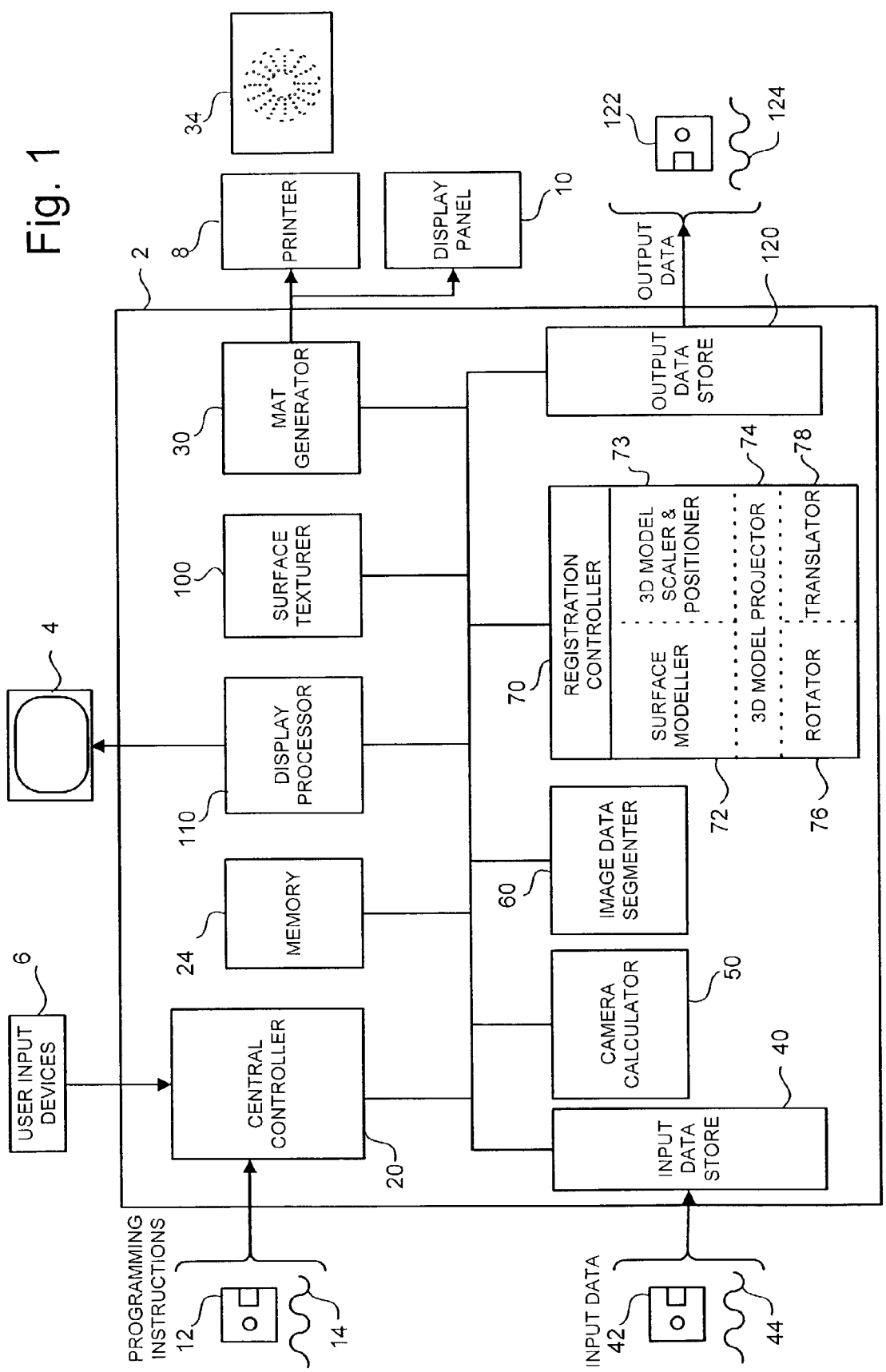

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, user input devices 6, such as a keyboard, mouse etc, a printer 8, and a display panel 10 comprising a flat panel having controllable pixels, such as the PL400 manufactured by WACOM.

The processing apparatus 2 is programmed to operate in accordance with programming instructions input, for example, as data stored on a data storage medium, such as disk 12, and/or as a signal 14 input to the processing apparatus 2, for example from a remote database, by transmission over a communication network (not shown) such as the Internet or by transmission through the atmosphere, and/or entered by a user via a user input device 6 such as a keyboard.

As will be described in more detail below, the programming instructions comprise instructions to cause the processing apparatus 2 to become configured to process input data defining a 3D computer model of a subject object and input data defining a plurality of images of the same subject object recorded at different positions and orientations, to register the 3D computer model and the images so that each image is correctly positioned and orientated relative to the 3D computer model given the view of the 3D computer model present in the image, and to extract texture data for the 3D computer model from the registered images. The registration of the 3D computer model and the input images is carried out by calculating the positions and orientations at which the input images were recorded relative to each other, thereby forming a registered set of input images, and then registering the 3D computer model with the registered set of input images. In this way, it is not necessary to register the input 3D computer model with each input image on an individual basis.

When programmed by the programming instructions, processing apparatus 2 can be thought of as being configured as a number of functional units for performing processing operations. Examples of such functional units and their interconnections are shown in FIG. 1. The units and interconnections illustrated in FIG. 1 are, however, notional, and are shown for illustration purposes only to assist understanding; they do not necessarily represent units and connections into which the processor, memory etc of the processing apparatus 2 actually become configured.

Referring to the functional units shown in FIG. 1, a central controller 20 is arranged to process inputs from the user input devices 6, and also to provide control and processing for the other functional units. Memory 24 is provided for use by central controller 20 and the other functional units.

Mat generator 30 is arranged to generate control signals to control printer 8 or to control display panel 10 to print a calibration pattern on a recording medium such as a piece of paper to form a printed "photographic mat" 34 or to display the calibration pattern on display panel 10 to display a photographic mat. As will be described in more detail below, the photographic mat comprises a predetermined calibration pattern of features and the subject object for which texture data is to be generated is placed on the printed photographic mat 34 or on the display panel 10 on which the calibration pattern is displayed. Images of the subject object and the calibration pattern are then recorded and input to the processing apparatus 2. Mat generator 30 is arranged to store data defining the calibration pattern of features printed or displayed on the photographic mat for use by the processing apparatus 2 when calculating the positions and orientations at which the input images were recorded. More particularly, in this embodiment, mat generator 30 is arranged to store data defining the pattern of features together with a coordinate system relative to the pattern of features (which, in effect, defines a reference position and orientation of the calibration pattern), and processing apparatus 2 is arranged to calculate the positions and orientations at which the input images were recorded in the defined coordinate system (and thus relative to the reference position and orientation). In this way, the recording positions and orientations of the input images are calculated relative to each other, and accordingly a registered set of input images is generated.

In this embodiment, the calibration pattern on the photographic mat comprises spatial clusters of features, for example as described in PCT Application WO-A-01/39124, now co-pending U.S. patent application Ser. No. 10/129,626 (the full contents of which are incorporated herein by cross-reference) or any known pattern of features, such as a pattern of coloured dots, with each dot having a different hue/brightness combination so that each respective dot is unique (for example, as described in JP-A-9-170914, which is equivalent to co-pending U.S. patent application Ser. No. 08/767,018), a pattern of concentric circles connected by radial line segments with known dimensions and position markers in each quadrant (for example, as described in "Automatic Reconstruction of 3D Objects Using a Mobile Camera" by Niem in Image and Vision Computing 17, 1999, pages 125–134), or a pattern comprising concentric rings with different diameters (for example as described in "The Lumigraph" by Gortler et al in Computer Graphics Proceedings, Annual Conference Series, 1996 ACM-0-89791-764-4/96/008).

In the remainder of the description of this embodiment, it will be assumed that the calibration pattern is printed by printer 8 on a recording medium (in this embodiment, a sheet of paper) to generate a printed photographic mat 34, although, as mentioned above, the calibration pattern could be displayed on display panel 10 instead.

Figure 2:
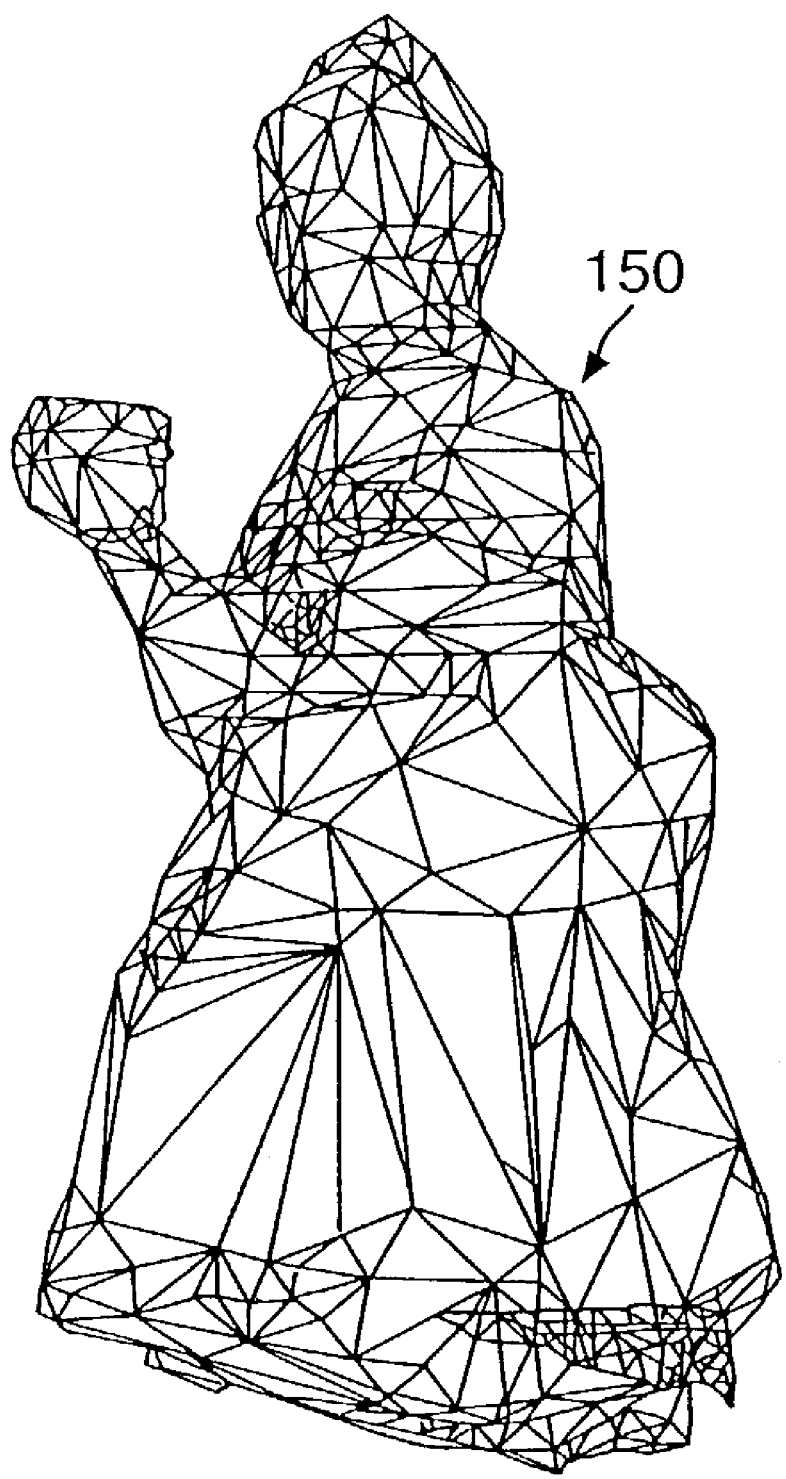
FIG. 2 shows an example of a 3D computer model comprising a polygon mesh representing the surface of a subject object input to the processing apparatus in FIG. 1.

Input data store 40 is arranged to store data input to the processing apparatus 2, for example as data stored on a storage device, such as disk 42, as a signal 44 transmitted to the processing apparatus 2, or using a user input device 6. The input data defines a 3D computer model of a subject object, and in this embodiment, the 3D computer model comprises a polygon mesh 150 representing the surface of the subject object, for example as shown in FIG. 2. The input data further defines a plurality of images of the subject object on the photographic mat 34 recorded at different positions and orientations. In addition, in this embodiment, the input data also includes data defining the scale of the input 3D computer model 150, and data defining the intrinsic parameters of the camera which recorded the input images, that is, the aspect ratio, focal length, principal point (the point at which the optical axis intersects the imaging plane), first order radial distortion coefficient, and skew angle (the angle between the axes of the pixel grid; because the axes may not be exactly orthogonal).

The input data defining the 3D computer model 150 of the subject object may be generated, for example, by a laser scanner, 3D touch sensing probe, computer aided design (CAD) system, etc.

The input data defining the input images may be generated, for example, by downloading pixel data from a digital camera which recorded the images, or by scanning photographs using a scanner (not shown).

The input data defining the scale of the input 3D computer model 150 and the input data defining the intrinsic camera parameters may be input by a user using a user input device 6.

Camera calculator 50 is arranged to process each input image to detect the positions in the image of the features in the calibration pattern of the photographic mat 34 and to calculate the position and orientation of the camera relative to the photographic mat 34 when the image was recorded. In this way, because the position and orientation of each input image is calculated relative to the same calibration pattern, the positions and orientations of the input images are defined in a common coordinate system and therefore a registered set of input images is generated.

Image data segmenter 60 is arranged to process each input image to separate image data corresponding to the subject object from other image data in the image.

Registration controller 70 is arranged to register the input 3D computer model 150 of the subject object with the registered set of input images generated by camera calculator 50.

In this embodiment, registration controller 70 comprises a surface modeller 72, a 3D model scaler and positioner 73, a 3D model projector 74, a rotator 76, and a translator 78.

Surface modeller 72 is arranged to process the segmented image data produced by image data segmenter 60 and the camera positions and orientations calculated by camera calculator 50, to generate data defining a second 3D computer model comprising a polygon mesh representing the surface of the subject object.

3D model scaler and positioner 73 is arranged to scale the input 3D computer model 150, based on the input scale data, so that it has the same scale as that of the second 3D computer model generated by surface modeller 72. 3D model scaler and positioner 73 is also arranged to position the scaled input 3D computer model 150 and the second 3D computer model generated by surface modeller 72 in the same coordinate system.

3D model projector 74 is arranged to project the scaled input 3D computer model 150 and the second 3D computer model generated by surface modeller 72 into each of three images having orthogonal viewing directions. 3D model projector 74 is further arranged to generate image data for display to the user showing the silhouettes of the two projected 3D computer models in each image.

Rotator 76 and translator 78 are arranged to rotate and translate at least one of the scaled input 3D computer model 150 and the second 3D computer model generated by surface modeller 72 in response to user input instructions.

As will be explained in detail below, the rotation and translation of the 3D computer model(s) by the user and the computer model projection and display of image data by 3D model projector 74 are carried out in an iterative manner. In this way, the results of the user's rotation and translation are displayed in real-time, enabling the user to make further rotations and translations to register correctly the input 3D computer model 150 and the second 3D computer model generated by surface modeller 72.

Surface texturer 100 is arranged to generate texture data from the input images for rendering on to the registered input 3D computer model 150.

Display processor 110, under the control of central controller 20, is arranged to display images and instructions to the user via display device 4 during the processing by processing apparatus 2. In addition, under control of central controller 20, display processor 110 is arranged to display images of the textured input 3D computer model 150 from a user-selected viewpoint by processing the input surface model data and rendering texture data produced by surface texturer 100 on to the surface model.

Output data store 120 is arranged to store data defining the input 3D computer model 150 and the texture data generated by surface texturer 100. Central controller 20 is arranged to control the output of data from output data store 120, for example as data on a storage device, such as disk 122, and/or as a signal 124. A recording of the output data may be made by recording the output signal 124 either directly or indirectly using recording apparatus (not shown).

Figure 3:
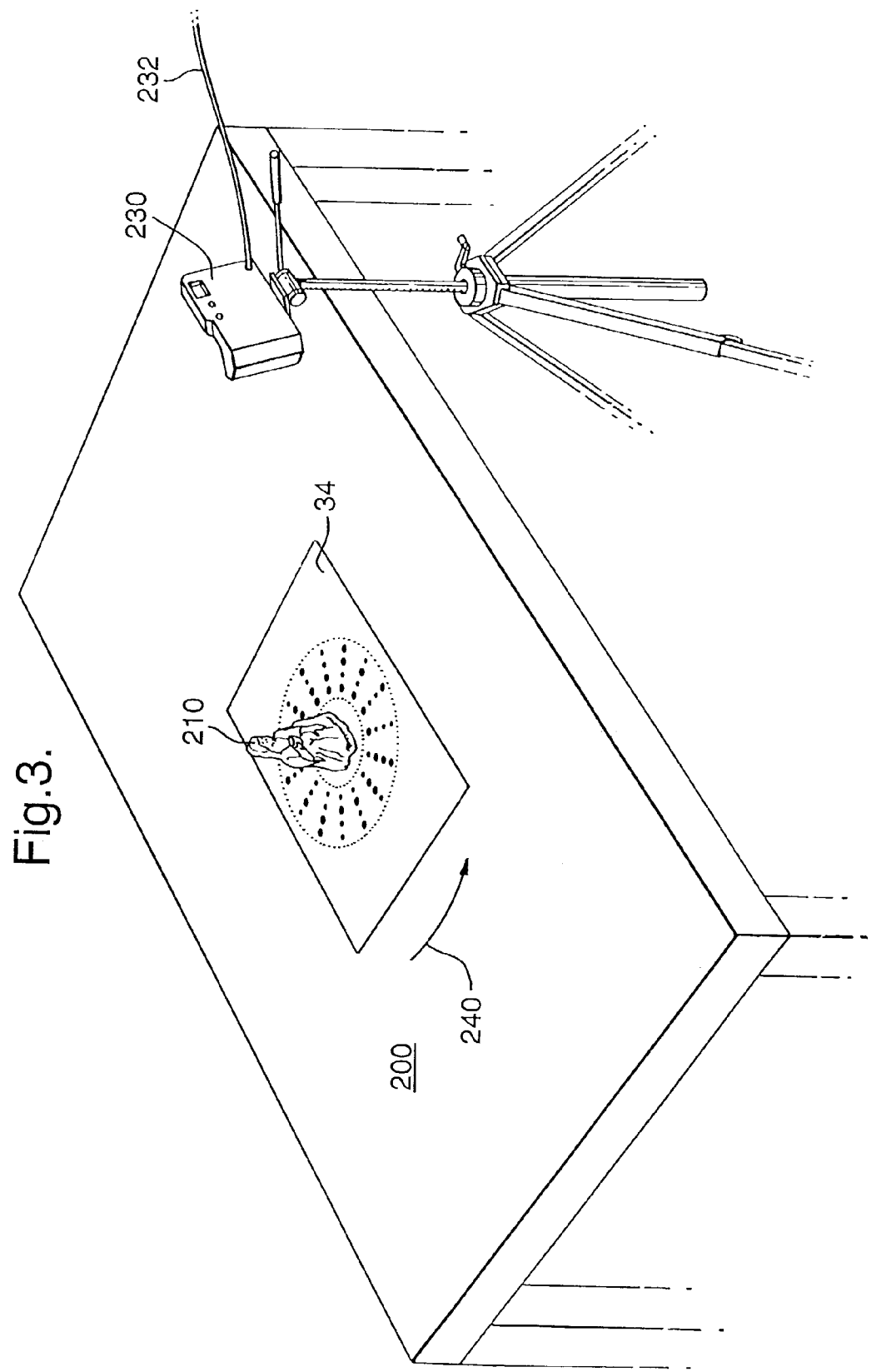
FIG. 3 illustrates the recording of images of the subject object to generate texture data for the 3D computer model of the subject object.

Referring now to FIG. 3, the recording of the input images for input to processing apparatus 2 will be described.

The printed photographic mat 34 is placed on a surface 200, and the subject object 210, represented by the input 3D computer model 150 and for which texture data is to be generated, is placed substantially at the centre of the photographic mat 34 so that the subject object 210 is surrounded by the features making up the calibration pattern on the mat.

Images of the subject object 210 and photographic mat 34 are recorded at different positions and orientations to show different parts of the subject object 210 using a digital camera 230. In this embodiment, data defining the images recorded by the camera 230 is input to the processing apparatus 2 as a signal 44 along a wire 232.

More particularly, in this embodiment, camera 230 remains in a fixed position, and photographic mat 34 with the subject object 210 thereon is moved (translated) and rotated (for example, in the direction of arrow 240) on surface 200 and photographs of the object 210 at different positions and orientations relative to the camera 230 are recorded. During the rotation and translation of the photographic mat 34 on surface 200, the subject object 210 does not move relative to the mat 34.

Images of the top of the subject object 210 are recorded by removing the camera 230 from the tripod and imaging the subject object 210 from above.

Figure 4:
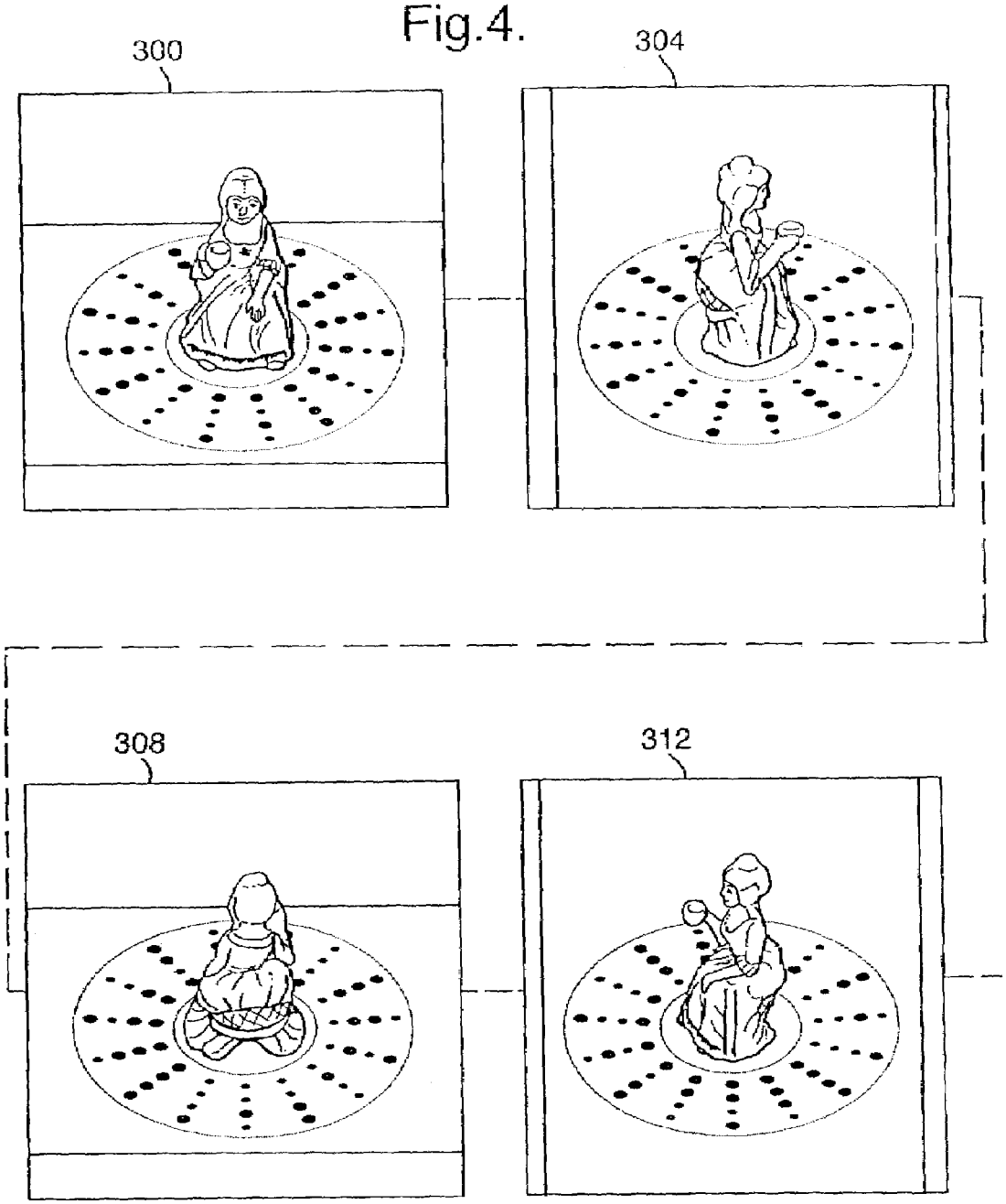
FIG. 4 illustrates examples of images of the subject object which are input to the processing apparatus in FIG. 1.

FIG. 4 shows examples of images 300, 304, 308 and 312 from a series of images defined in data input to processing apparatus 2 showing the subject object 210 and photographic mat 34 in different positions and orientations relative to camera 230.

Figure 5:
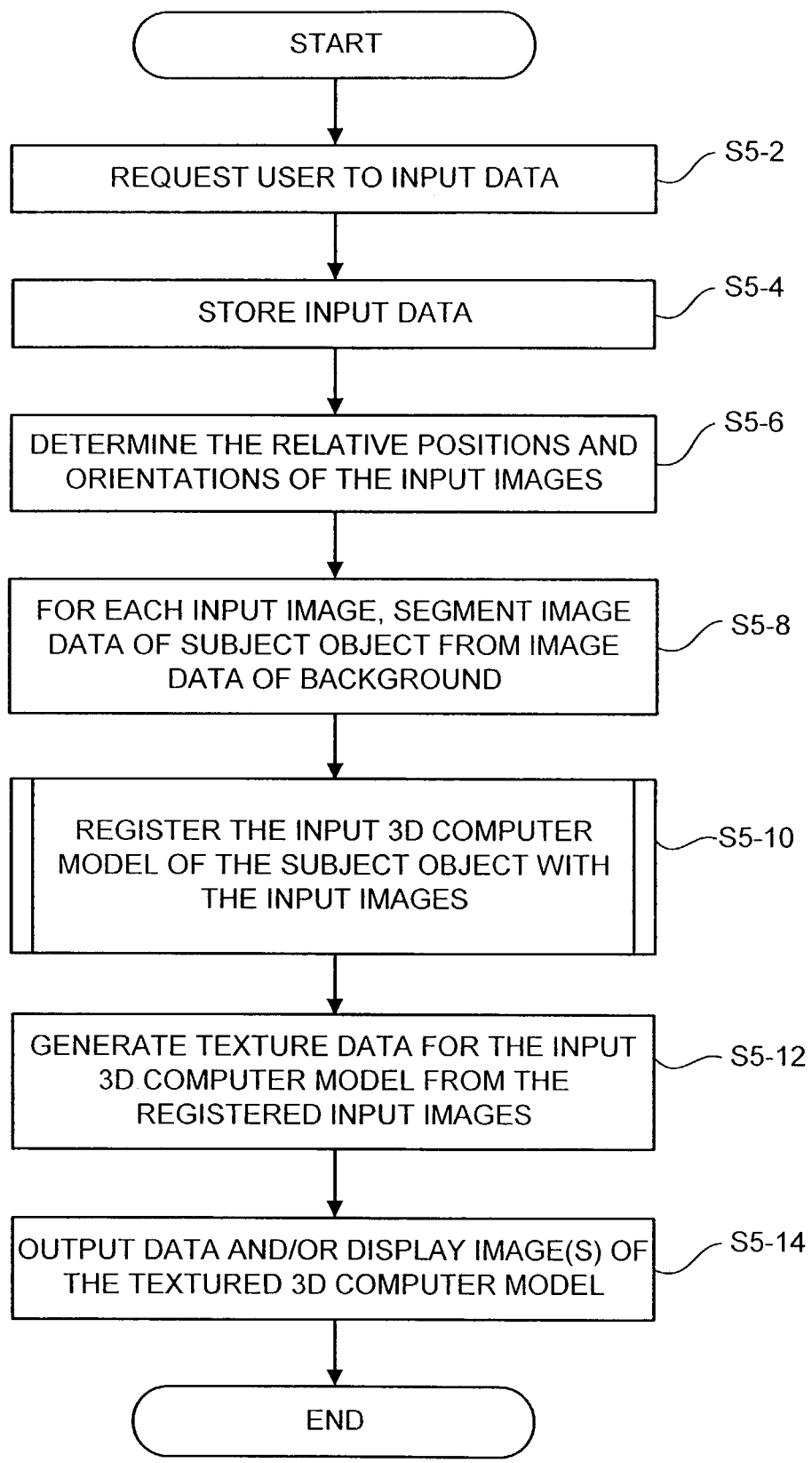
FIG. 5 shows the processing operations performed by the processing apparatus in FIG. 1 to process input data.

FIG. 5 shows the processing operations performed by processing apparatus 2 to process the input data in this embodiment.

Referring to FIG. 5, at step S5-2, central controller 20 causes display processor 110 to display a message on display device 4 requesting the user to input data for processing.

At step S5-4, data input by the user in response to the request at step S5-2 is stored in the input data store 40. More particularly, as set out above, in this embodiment, the input data comprises data defining an input 3D computer model 150 of the subject object 210, data defining images of the subject object 210 recorded at different relative positions and orientations, data defining the scale of the input 3D computer model 150, and data defining the intrinsic parameters of the camera 230 which recorded the input images.

At step S5-6, camera calculator 50 processes the image data and intrinsic camera parameter data stored at step S5-4, to determine the position and orientation of the camera 230 relative to the calibration pattern on the photographic mat 34 (and hence relative to the subject object 210) for each input image. This processing comprises, for each input image, detecting the features in the image which make up the calibration pattern on the photographic mat 34, comparing the positions of the features in the image to the positions of the features in the stored pattern for the photographic mat, and calculating therefrom the position and orientation of the camera 230 relative to the mat 34 when the image was recorded. The processing performed by camera calculator 50 at step S5-6 depends upon the calibration pattern of features used on the photographic mat 34. Accordingly, suitable processing is described, for example, in PCT Application GB00/04469 (WO-A-01/39124), JP-A-9-170914 (corresponding to U.S. patent application Ser. No. 08/767,018), "Automatic Reconstruction of 3D Objects Using a Mobile Camera" by Niem in Image and Vision Computing 17, 1999, pages 125–134, and "The Lumigraph" by Gortler et al in Computer Graphics Proceedings, Annual Conference Series, 1996 ACM-O-89791-764-4/96/008. It should be noted that the positions of the features of the calibration pattern in each input image may be identified to processing apparatus 2 by the user (for example by pointing and clicking on each calibration pattern feature in displayed images) rather than being detected independently by camera calculator 50 using the image processing techniques in the listed references.

At step S5-8, image data segmentor 60 processes each input image stored at step S5-4 to segment image data representing the subject object 210 from other image data ("background" image data). This processing is performing using a conventional image segmentation method, for example as described in part 2.2 of Annex A of GB-A-2358307.

Figure 6:
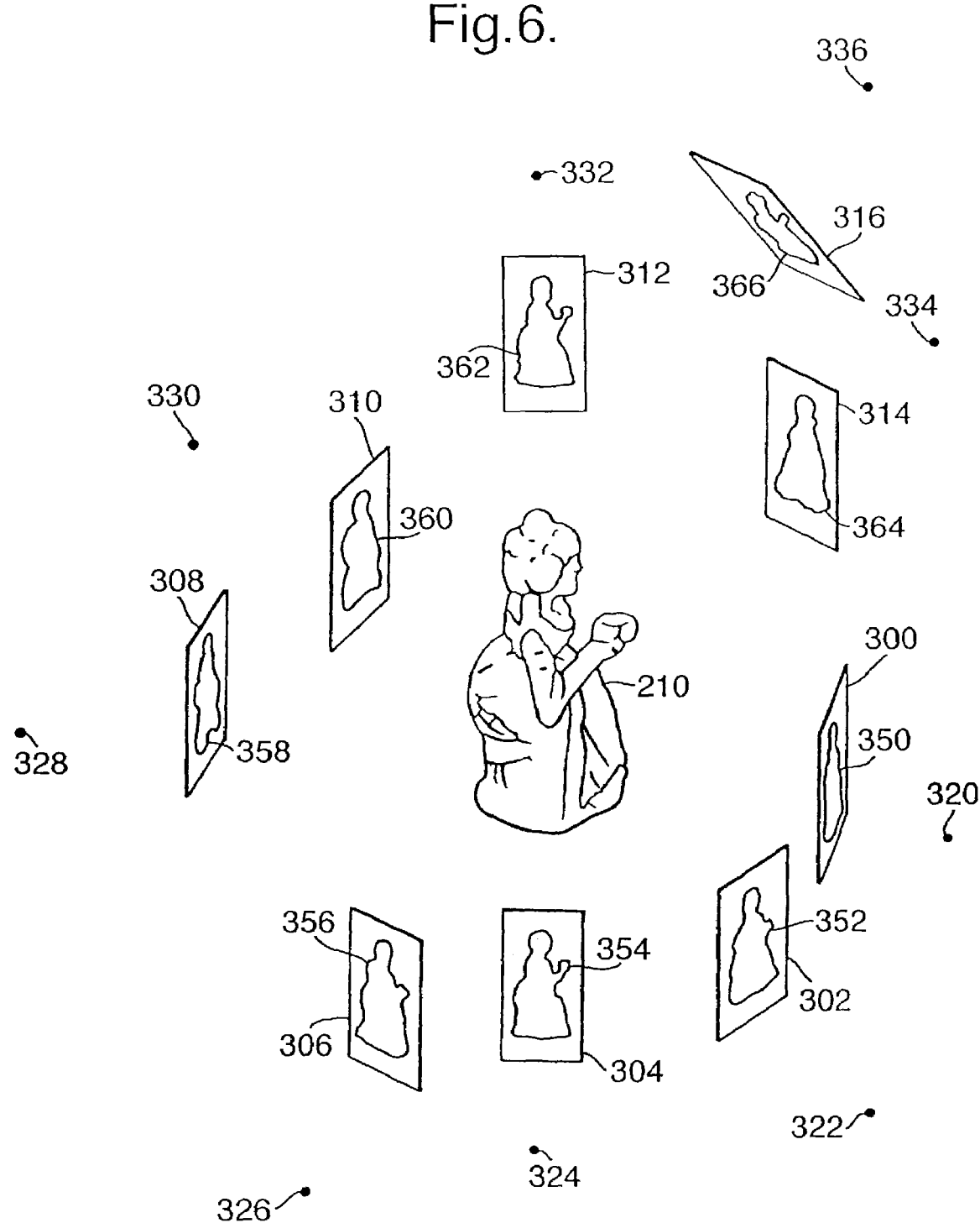
FIG. 6 illustrates the results of the processing performed at steps S5-6 and S5-8 in FIG. 5.

Referring to FIG. 6, at this stage in the processing, therefore, the silhouette 350–366 of the subject object 210 in each of a plurality of input images 300–316 has been calculated, and the relative position and orientation of each silhouette in 3D space has been calculated (because each silhouette 350–366 lies in the two-dimensional plane of an input image and the position and orientation of each input image has been calculated by camera calculator 50 at step S5-6). In addition, the position of the focal point 320–336 for each input image is also known from the input data and the calculations by camera calculator 50.

Referring again to FIG. 5, at step S5-10, registration controller 70 performs processing to register the input 3D computer model 150 with the registered set of input images 300–316. As will be described below, in this embodiment, the registration by registration controller 70 is carried out in accordance with instructions input by a user.

Figure 7:
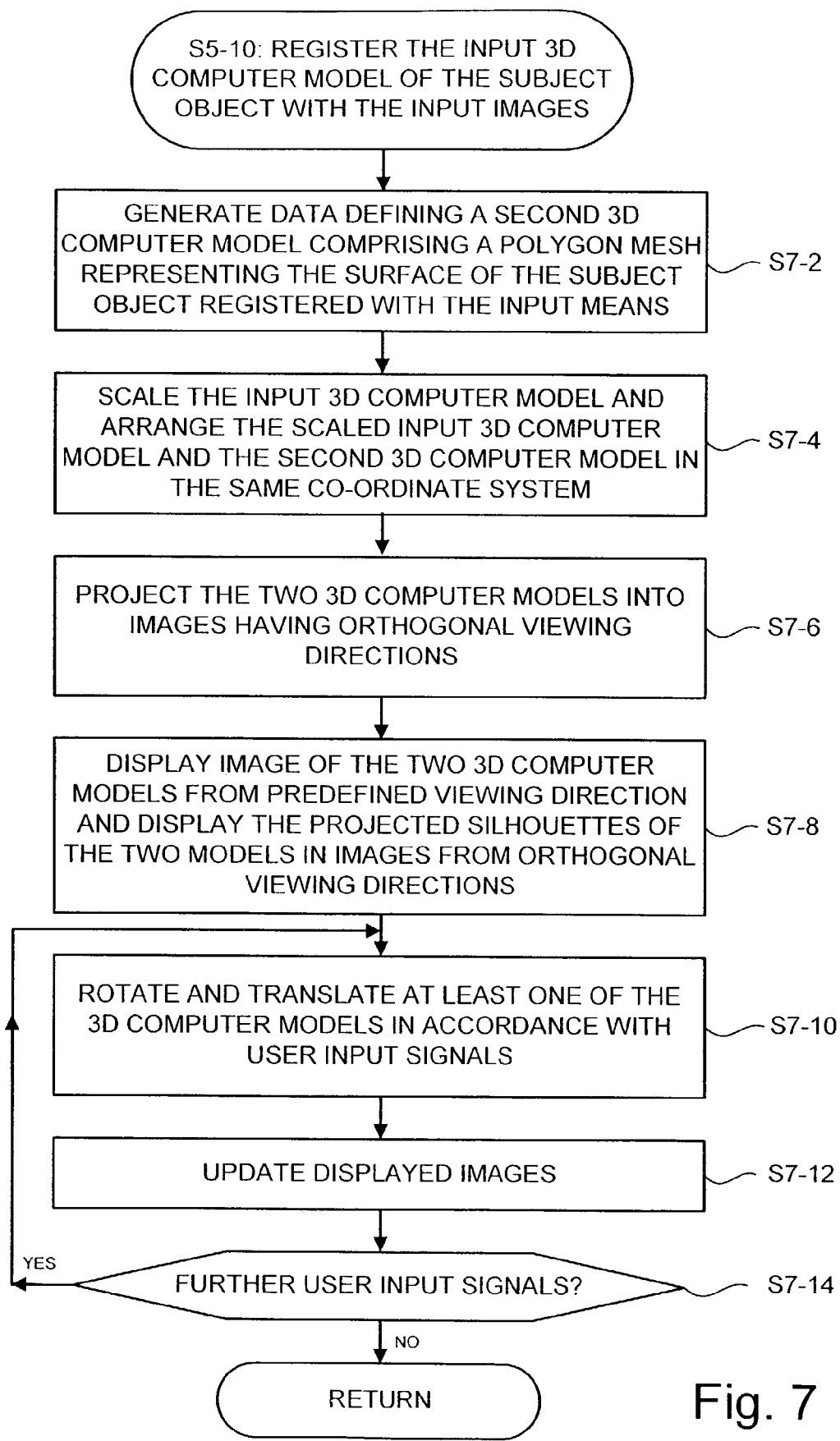
FIG. 7 shows the processing operations performed at step S5-10 in the first embodiment to register the input 3D computer model of the subject object with the input images.

FIG. 7 shows the processing operations performed at step S5-10 by registration controller 7 in the first embodiment.

Referring to FIG. 7, at step S7-2, surface modeller 72 generates a second 3D computer model comprising a polygon mesh representing the surface of the subject object 210.

More particularly, referring again to FIG. 6, each silhouette 350–366 defines, together with the focal point position 320–336 of the camera when the image in which the silhouette is situated was recorded, an infinite cone in 3D space which touches the surface of the subject object 210 at (as yet unknown) points in the 3D space (because the silhouette defines the outline of the subject object surface in the image).

In this embodiment, surface modeller 72 performs processing at step S7-2 to determine the volume of 3D space defined by the intersection of the infinite cones defined by all of the silhouettes 350–366, and to represent the intersection volume by a mesh of connecting planar polygons.

This processing may be carried out using the technique described in the proprietor's co-pending U.S. patent application Ser. No. 10/164,435 (the full contents of which are incorporated herein by cross-reference), or may be carried out using a conventional method, for example such as that described in "A Volumetric Intersection Algorithm for 3D-Reconstruction Using a Boundary-Representation" by Martin Löhlein at http://i31www.ira.uka.de/diplomarbeiten/da_martin_loehlein/Reconstruction.html or as described in "An Algorithm for Determining the Intersection of Two Simple Polyhedra" by M. Szilvasi-Nagy in Computer Graphics Forum 3 (1984) pages 219–225.

Alternatively, surface modeller 72 may perform shape-from-silhouette processing for example as described in "Looking to build a model world: automatic construction of static object models using computer vision" by Illingsworth and Hilton in Electronics and Communication Engineering Journal, June 1998, pages 103–113, or "Automatic reconstruction of 3D objects using a mobile camera" by Niem in Image and Vision Computing 17 (1999) pages 125–134. In these methods the intersections of the silhouette cones are calculated and used to generate a "volume representation" of the subject object made up of a plurality of voxels (cuboids). More particularly, 3D space is divided into voxels, and the voxels are tested to determine which ones lie inside the volume defined by the intersection of the silhouette cones. Voxels inside the intersection volume are retained to define a volume of voxels representing the subject object. The volume representation is then converted into a surface model comprising a mesh of connected polygons.

The result of the processing at step S7-2 is a second polygon mesh representing the surface of the subject object 210. Because the second polygon mesh is generated using the input images 300–316 as described above, the second polygon mesh is registered to the input images (that is, its position and orientation is known relative to the positions and orientations of the input images 300–316).

At step S7-4, 3D model scaler and positioner 73 scales the input 3D computer model 150 to the same scale as that of the coordinate system in which the positions and orientations of the input images 300–316 were calculated by camera calculator 50 and in which the second 3D computer model generated by surface modeller 72 is defined.

More particularly, the scale of the input 3D computer model 150 is defined in the input data stored at step S5-4. Further, the scale for the coordinate system containing the input images and the second 3D computer model is known because the size of the calibration pattern printed on photographic mat 34 is stored by mat generator 30 and subsequently used to define the coordinate system in which the positions and orientations of the input images 300–316 are calculated by camera calculator 50 and in which the second 3D computer model subject object is generated by the surface modeller 72.

Also at step S7-4, 3D model scaler and positioner 73 arranges the scaled input 3D computer model 150 in the same coordinate system as that of the input images and the second 3D computer model.

More particularly, in this embodiment, 3D model scaler and positioner 73 places the scaled input 3D computer model 150 in the coordinate system of the input images and second 3D computer model so that the centre of the base of the scaled input 3D computer model is at a position corresponding to the centre of the calibration pattern on photographic mat 34. This is done because it is known that the user will have placed the subject object 210 at the centre of the calibration pattern for imaging. Consequently, the second 3D computer model will have been generated at step S7-2 by surface modeller 72 with a corresponding position in the centre of the calibration pattern. Therefore, by placing the scaled input 3D computer model 150 in the centre of the calibration pattern, the positions of the scaled input 3D computer model 150 and the second 3D computer model generated by surface modeller 72 will be approximately aligned.

At step S7-6, 3D model projector 74 projects the scaled input 3D computer model 150 and the second 3D computer model generated by surface modeller 72 into images having orthogonal viewing directions. More particularly, in this embodiment, 3D model projector 74 projects the 3D computer models into images having viewing directions along the X, Y and Z coordinate axes of the coordinate systems in which the models are arranged.

At step S7-8, 3D model projector 74 controls display processor 110 to display images on display device 4 comprising an image of the scaled input 3D computer model 150 and the second 3D computer model generated by surface modeller 72 from a predefined viewing direction, and images of the projected silhouettes (that is, outlines) of the two 3D computer models in the orthogonal viewing direction images generated at step S7-6.

Figure 8:
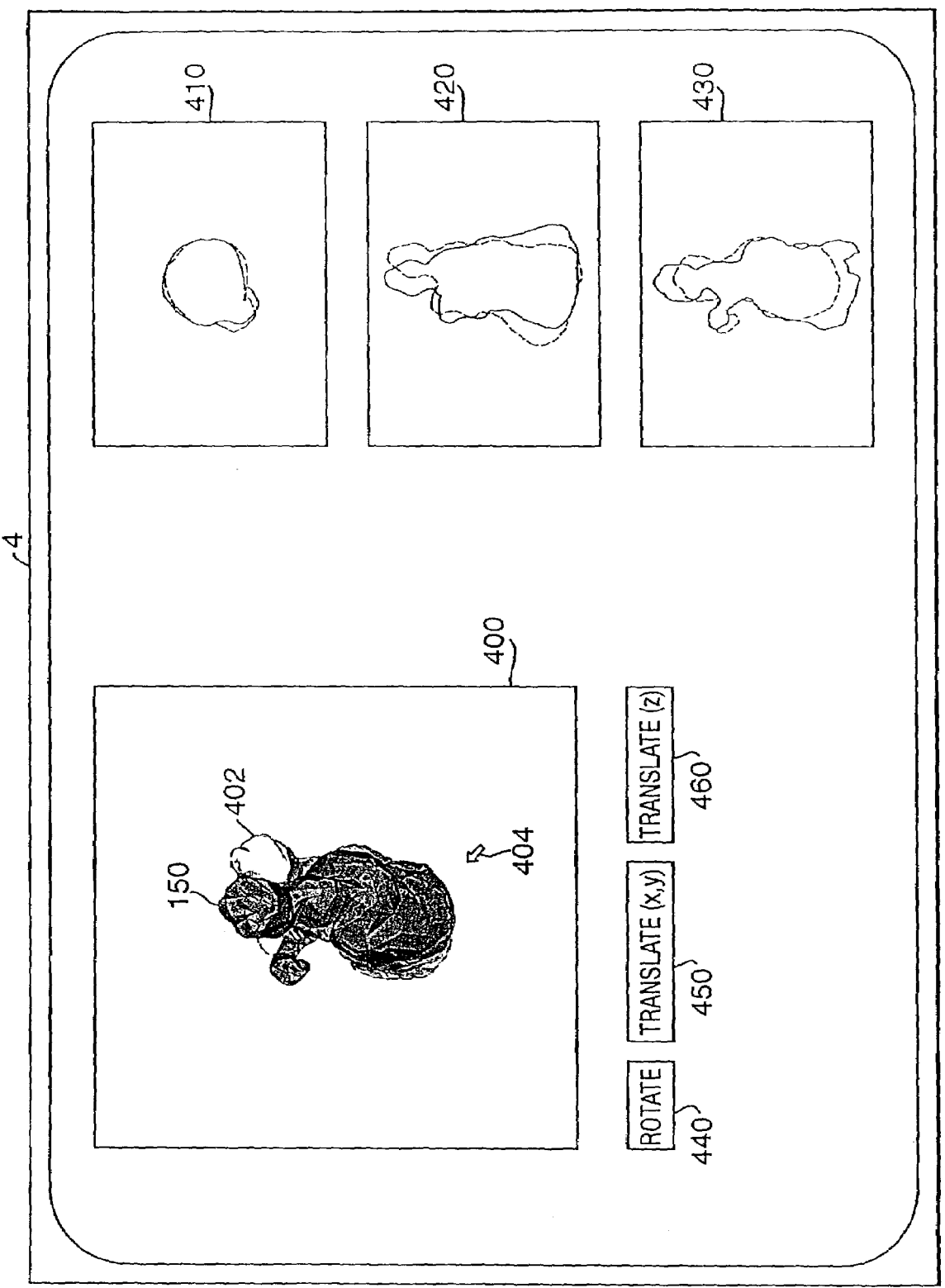
FIG. 8 illustrates the images displayed to the user in the first embodiment at steps S7-8 and S7-12.

FIG. 8 shows an example of the images displayed to the user on display device 4 in this embodiment at step S7-8.

Referring to FIG. 8, image 400 shows the input 3D computer model 150 and the second 3D computer model 402 generated by surface modeller 72. Each computer model 150,402 is presented to the user as a solid model, by rendering each polygon in the input wire frame model 150 and in the wire frame model generated by surface modeller 72 as a plane surface. To assist the viewer in distinguishing between the two 3D computer models, one of the 3D computer models is shown in a bolder form than the other in image 400.

Image 410 shows the silhouettes of the input 3D computer model and the second 3D computer model when projected into an image having a viewing direction along the Z-coordinate axis at step S7-6.

Similarly, image 420 shows the projected silhouettes of the two 3D computer models in an image having a viewing direction along the X-coordinate axis, and image 430 shows the silhouettes of the two 3D computer models from an image having a viewing direction along the Y-coordinate axis.

To assist the user in distinguishing between the displayed silhouettes, in each of images 410, 420 and 430, one of the silhouettes is represented by a solid line and the other silhouette is represented by a dotted line.

Also provided on display device 4 are a pointer 404 for movement by the user using a user input device 6, such as a mouse, a "rotate" button 440, a "translate (X, Y)" button 450, and a "translate (Z)" button 460.

By moving the pointer 404 on image 400 to point and click on one of the two 3D computer models 150,402, the user is able to select a 3D computer model for subsequent movement.

By pointing and clicking on "rotate" button 440, the user is then able to rotate the selected 3D computer model by further movement of the pointer 404. More particularly, by clicking once on "rotate" button 440, the user is able to rotate the selected 3D computer model about the X-coordinate axis, by clicking twice on "rotate" button 440, the user is able to rotate the selected 3D computer model about the Y-coordinate axis, and by clicking three times on "rotate" button 440, the user is able to rotate the selected 3D computer model about the Z-coordinate axis.

By pointing and clicking on "translate (X,Y)" button 450, the user is able to translate the selected 3D computer model in the X, Y coordinate plane by movement of pointer 404.

Similarly, by pointing and clicking on "translate (Z)" button 460, the user is able to translate the selected 3D computer model in the Z coordinate direction by subsequent movement of the pointer 404.

Referring again to FIG. 7, at steps S7-10 to S7-14, the user repeatedly changes the relative positions and orientations of the two 3D computer models 150,402 in 3D space while viewing the effect of the changes in images 400,410,420 and 430, which are updated in real-time to show the changes as they are made by the user. The user is able to align accurately the two 3D computer models 150,402 in 3D space by changing their relative positions and orientations so that the errors between the alignment of the projected silhouettes in images 410, 420 and 430 are minimised. By registering the position and rotation of the two 3D computer models 150,402 in this way, the user also registers the input 3D computer model 150 to the registered set of input images 300–316 (because, as explained above, the second 3D computer model 402 is registered to the set of input images).

More particularly, at step S7-10, rotator 76 and translator 78 rotate and translate the 3D computer models 150, 402 in accordance with user input signals generated as explained above.

At step S7-12, 3D model projector 74 and display processor 110 update the images 400, 410, 420, 430 displayed to the user, so that the images agree with the new positions and orientations of the 3D computer models 150, 402 as the user rotates and translates them. In this way, as well as updating image 400, orthogonal viewing direction images 410, 420 and 430 are updated so that the user can see the effect of his movement of the 3D computer models and judge the errors in the registration of the two 3D computer models 150,402.

By repeated rotation and translation of at least one of the 3D computer models 150, 402, the user is able to minimise errors in the alignment of the silhouettes shown in images 410, 420 and 430 and therefore accurately register the two 3D computer models 150, 402.

At step S7-14, registration controller 70 determines whether further user input signals have been received to move a 3D computer model 150, 402. Steps S710 to S714 are repeated until the user has made all of the necessary adjustments to the relative positions and orientations of the 3D computer models 150, 402 to accurately register them.

When the input 3D computer model 150 has been registered with the second 3D computer model 402, the input 3D computer model 150 is in registration with all of the input images 300–316. This is because the second 3D computer model 402 was generated from the registered set of input images 300–316 and is therefore already in registration with all of the input images 300–316.

Consequently, knowing the position and orientation of the input 3D computer model 150 relative to the input images 300–316, texture data for the input 3D computer model 150 can be generated from the input images 300–316.

Accordingly, referring again to FIG. 5, at step S5-12, surface texturer 100 processes the input images 300–316 to generate texture data therefrom for the input 3D computer model 150.

More particularly, in this embodiment, surface texturer 100 performs processing in a conventional manner to select each triangle in the input 3D computer model 150 and to find the input image "i" which is most front-facing to a selected triangle. That is, the input image is found for which the value $\hat{n}t·\hat{v}i$ is largest, where $\hat{n}t$ is the triangle normal, and $\hat{v}i$ is the viewing direction for the "i"th image. This identifies the input image in which the selected surface triangle has the largest projected area.

The selected surface triangle is then projected into the identified input image, and the vertices of the projected triangle are used as texture coordinates to define an image texture map.

Other techniques that may be used by surface texturer 100 to generate texture data at step S5-12 are described in UK patent applications GB-A-2369541 and GB-A-2369260, and co-pending U.S. patent application Ser. No. 09/981,844 (US 20020085748A1), the full contents of which are incorporated herein by cross-reference.

The result of performing the processing described above is a 3D computer model 150 of the subject object 210, together with texture coordinates defining image data from the input images 300–316 to be rendered onto the model.

Data defining the 3D computer model 150 is stored in output data store 120 together with texture data. The stored texture data may comprise data defining each of the input images 300–316 to be used for texture data together with data defining the texture coordinates in the input images. Alternatively, the pixel data to be used as texture data may be extracted from the input images 300–316 and stored in output data store 120.

At step S5-14, central controller 20 outputs data defining the 3D computer model 150 and the texture data from output data store 120, for example as data stored on a storage device such as disk 122 or as a signal 124 (FIG. 1). In addition, or instead, central controller 20 causes display processor 110 to display on display device 4 an image of the input 3D computer model 150 rendered with the generated texture data in accordance with a viewpoint input by the user, for example using a user input device 6.

SECOND EMBODIMENT

A second embodiment of the invention will now be described.

In the first embodiment described above, the user registers the input 3D computer model 150 to the registered set of input images 300–316 by aligning the input 3D computer model 150 with a second 3D computer model 402 generated from the input images by surface modeller 72.

However, the input 3D computer model 150 may be registered with the input images 300–316 in other ways.

For example, a second embodiment will now be described, in which no 3D computer model is generated from the input images 300–316, and instead, the user changes the relative position and rotation of the input 3D computer model 150 and the coordinate system in which the input images 300–316 are registered. Errors in the registration are checked by the user by viewing the silhouette of the input 3D computer model 150 when projected into at least some of the input image 300–316 and comparing the projected silhouette with the silhouettes already present in the input images generated by image data segmenter 60.

The components of the second embodiment and the processing operations performed thereby are the same as those in the first embodiment, with the exception that registration controller 70 does not include a surface modeller 72, and the processing operations performed by the components of registration controller 70 at step S5-10 are different from those in the first embodiment. Accordingly, only the processing performed at step S5-10 will be described below, because the other processing has already been described in the first embodiment.

Figure 9:
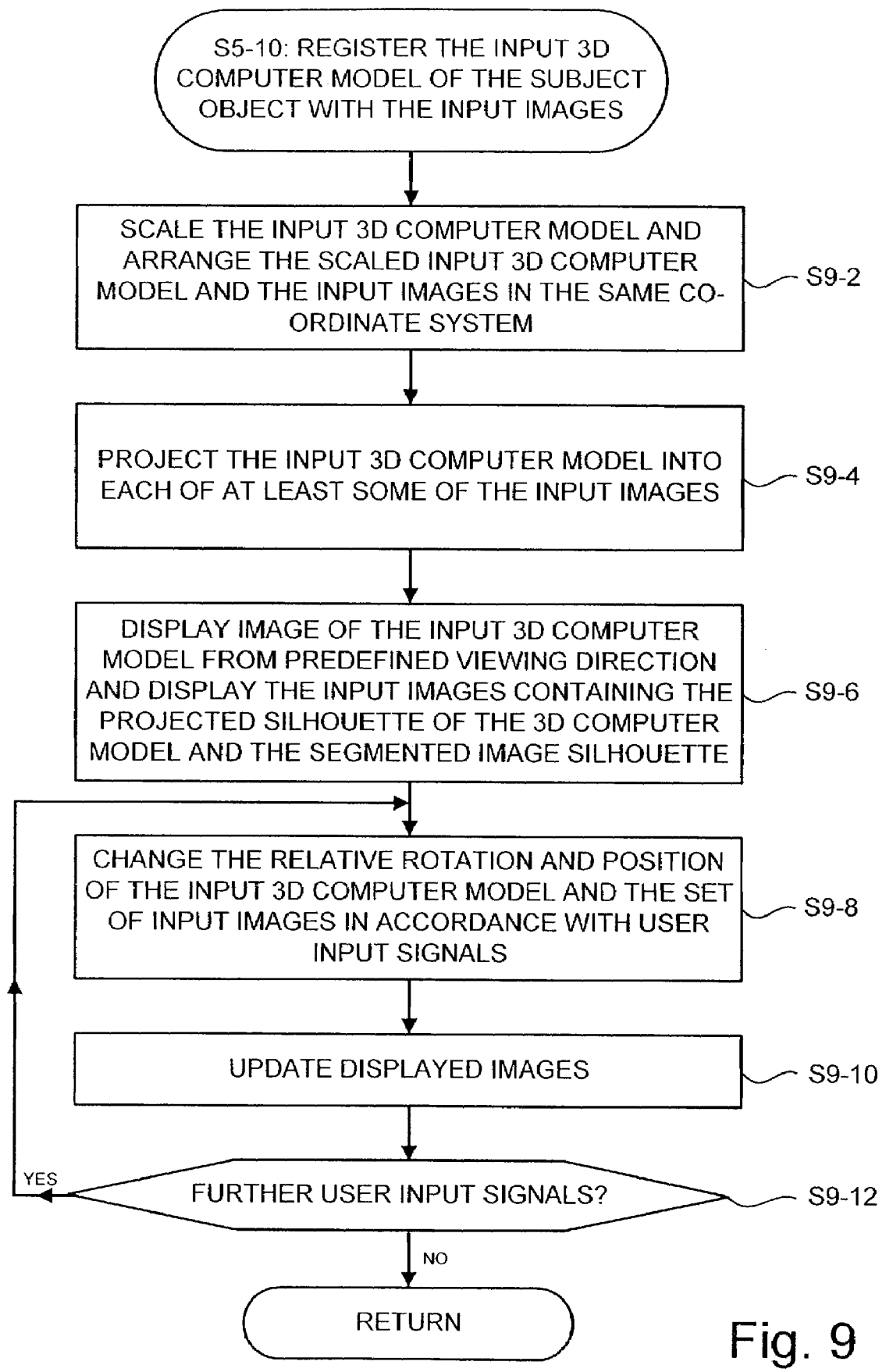
FIG. 9 shows the processing operations performed at step S5-10 in a second embodiment to register the input 3D computer model of the subject object with the input images.

FIG. 9 shows the processing operations performed by registration controller 70 at step S5-10 in the second embodiment to register the input 3D computer model 150 with the registered set of input images 300–316.

Referring to FIG. 9, at step S9-2, 3D model scaler and positioner 73 scales the input 3D computer model 150 to the same scale as the coordinate system of the registered set of input images (this scale having previously been calculated by camera calculator 50 in the processing at step S5-6), and arranges the scaled input 3D computer model 150 in the same coordinate system as the registered set of input images. More particularly, as in the first embodiment, 3D model scaler and positioner 73 arranges the scaled input 3D computer model 150 so that the centre of its base is at the position corresponding to the centre of the calibration pattern on the photographic mat 34. In this way, the position of the scaled input 3D computer model 150 is approximately correct relative to the input images 300–316 (because each of the input images 300–316 shows an image of the subject object 210 at the centre of the calibration pattern as explained previously).

At step S9-4, 3D model projector 74 projects the scaled input 3D computer model 150 into each of at least some of the input images 300–316.

More particularly, in this embodiment, 3D model projector 74 selects three input images having approximately orthogonal viewing directions, and projects the scaled input 3D computer model 150 into the three selected input images. Thus, referring to the example in FIG. 6, the input images 300, 312 and 316 may be selected by 3D model projector 74 as the input images into which the scaled input 3D computer model 150 is projected.

At step S9-6, 3D model projector 74 controls display processor 110 to display images to the user on display device 4 comprising an image of the scaled input 3D computer model 150 from a predefined viewing direction, and each input image selected at step S9-4 showing the projected silhouette of the scaled input 3D computer model 150 together with the segmented image silhouette generated by image data segmentor 60 at step S5-8.

Figure 10:
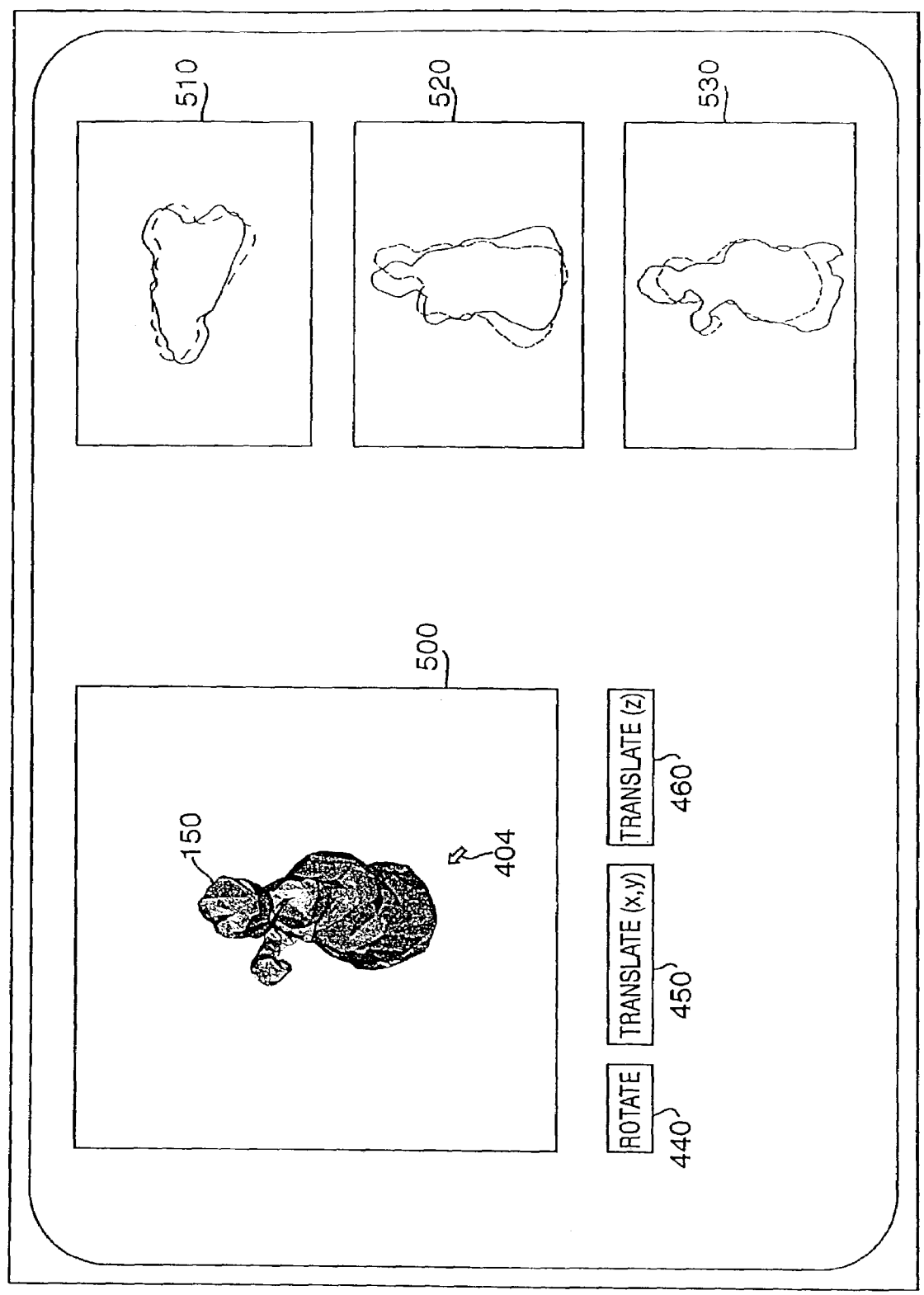
FIG. 10 illustrates the images displayed to the user in the second embodiment at step S9-6 and S9-10.

FIG. 10 shows an example of the images displayed to the user at step S9-6 in the second embodiment.

Referring to FIG. 10, image 500 shows a view of the scaled input 3D computer model 150, image 510 shows the silhouette of the scaled input 3D computer model 150 when it is projected into input image 316 together with the silhouette 366 already existing in input image 316 as a result of the processing by image data segmenter 60, image 520 shows the silhouette of the scaled input 3D computer model 150 when projected into input image 300 together with the silhouette 350 in the input image 300 generated by image data segmenter 60, and image 530 shows the silhouette of the scaled input 3D computer model 150 when projected into input image 312 together with the silhouette 362 in the input image 312 produced by image data segmenter 60.

As in the first embodiment, a "rotate" button 440, a "translate (X,Y)" button 450 and a "translate (Z)" button 460 are provided for selection by the user by pointing and clicking using the pointer 404. Following selection of the "rotate" button 440, the user is able to rotate the scaled input 3D computer model 150 shown in the image 500 by movement of the pointer 404, and is able to change the position of the model 150 by movement of the pointer 404 following selection of the "translate (X,Y)" button 450 or the "translate (Z)" button 460.

As the user rotates and translates the input 3D computer model 150, images 500, 510, 520 and 530 are updated in real-time so that the user can see the effect of the movements as he makes them. In particular, the user can view errors between the alignment of the silhouettes in the images 510, 520 and 530, and therefore can rotate and translate the input 3D computer model 150 to minimise the alignment errors, and therefore register the input 3D computer model 150 with the registered set of input images 300–316.

More particularly, referring again to FIG. 9, at step S9-8, rotator 76 and translator 78 change the rotation and position of the input 3D computer model 150 relative to the coordinate system of the registered set of input images 300–316 in accordance with input signals from the user generated as described above.

At step S9-10, 3D model projector 74 and display processor 110 update images 500, 510, 520 and 530 displayed to the user to show the results of the changes to the rotation and/or position at step S9-8.

At step S9-12, registration control 70 determines whether further input signals have been received from the user to translate or rotate the input 3D computer model 150. Steps S9-8 to S9-12 are repeated until the user has completed registration of the input 3D computer model 150 to the registered set of input images 300–316.

THIRD EMBODIMENT

A third embodiment of the invention will now be described.

In the first and second embodiments described above, registration controller 70 registers the input 3D computer model 150 and the input images 300–316 on the basis of signals input from a user defining relative changes to the position and orientation of the input 3D computer model 150 and the registered set of input images.

However, the registration of the input 3D computer model 150 to the registered set of input images 300–316 may be carried out automatically by registration controller 70 without input from the user, as will now be described in the third embodiment.

The components of the third embodiment and the processing operations performed thereby are the same as those in the first embodiment, with the exception of the components of the registration controller 70 and the processing operations performed by these components. Accordingly, only these differences will be described below.

Figure 11:
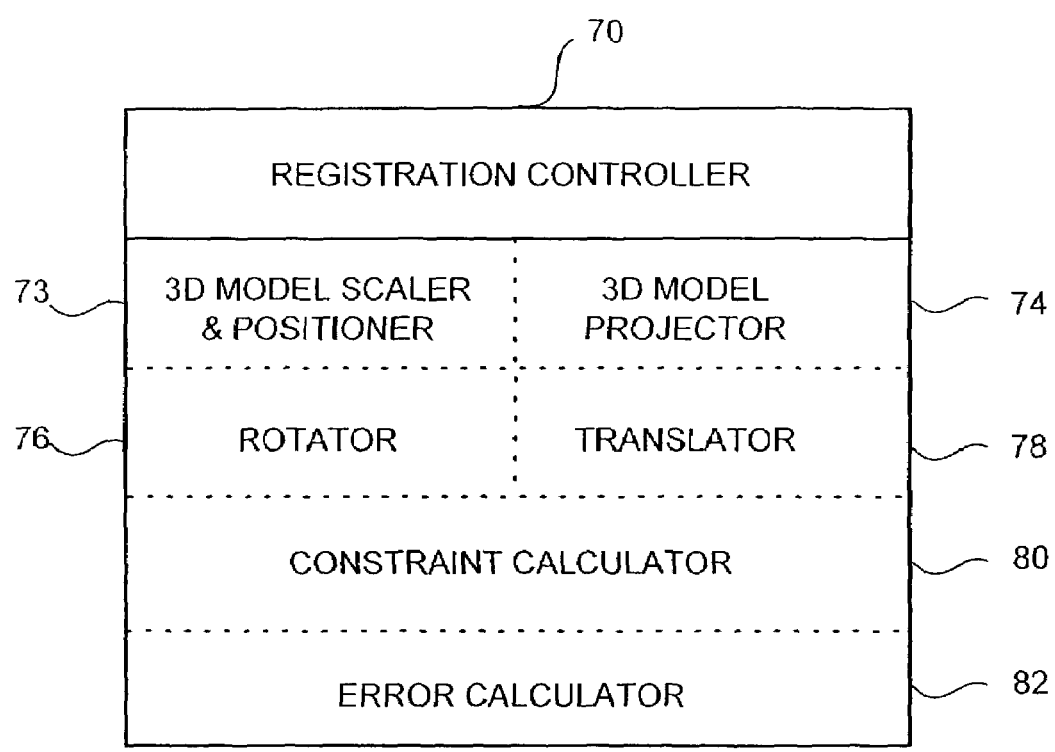
FIG. 11 shows the functional components of the registration controller from the processing apparatus in a third embodiment.

FIG. 11 shows the functional components of the registration controller 70 in the third embodiment.

Referring to FIG. 11, the registration controller 70 of the third embodiment comprises 3D model scaler and positioner 73, 3D model projector 74, rotator 76 and translator 78, as in the third embodiment. In addition, however, registration controller 70 also includes a constraint calculator 80 and an error calculator 82, the processing functions of which will be described below.

FIG. 12 shows the processing operations performed by the components of the registration controller 70 at step S5-10 in the third embodiment to register the input 3D computer model 150 with the registered set of input images 300–312 generated by camera calculator 50.

Referring to FIG. 12, at step S12-2, 3D model scaler and positioner 73 scales the input 3D computer model 150 in the same way as in the first embodiment so that it has the same scale as that of the coordinate system in which the input images 300–316 are registered (previously calculated by camera calculator 50 at step S5-6). In addition, 3D model scaler and positioner 73 arranges the scaled input 3D computer model 150 in the same coordinate system as the registered input images. More particularly, as in the first and second embodiments, 3D model scaler and positioner 73 places the scaled input 3D computer model 150 in the coordinate system so that the centre of its base is at a position corresponding to the centre of the calibration pattern in the photographic mat 34. In this way, the position of the input 3D computer model 150 is approximately correct for the input images 300–316, although its rotation is, at this stage, arbitrary.

At step S12-4, error calculator 82 calculates a limit within which the scaled input 3D computer model 150 can be translated in subsequent processing. This limit is imposed since, as described above, the position of the scaled input 3D computer model 150 is approximately correct as a result of the processing at step S12-2, and therefore a limit can be placed on subsequent translation of the input 3D computer model 150, decreasing the processing time to register the input 3D computer model 150 with the registered set of input images 300–316.

In this embodiment, error calculator 82 sets the translation constraint at step S12-4 to be 10% of the size of the scaled input 3D computer model 150, with the size being calculated as the square root of the maximum eigenvalue of the covariance matrix of the vertices of the scaled input 3D computer model 150. In subsequent processing, the input 3D computer model 150 is not allowed to move by more than this amount in any direction from its position at that time.

At step S12-6 registration controller 70 sets the value of a counter, indicating the number of processing iterations carried out, to 0.

At step S12-8, 3D model projector 74 projects the scaled input 3D computer model 150 (having the position and orientation arranged at step S12-2) into each of the input images 300–316.

At step S12-10, error calculator 82 performs processing for each input image to compare the projected silhouette of the scaled input 3D computer model 150 (generated at step S12-8) with the silhouette present in the input image as a result of the processing at step S5-8 by image data segmenter 60. More particularly, in this embodiment, error calculator 82 generates a difference image for each input image by setting the value of each pixel in the input image to the value 1 if the pixel is within one, but not both, of the silhouettes, and to the value 0 otherwise (that is, if the pixel is within both silhouettes or is outside both silhouettes). In this way, pixels in each difference image are set to the value 1 at every position where the silhouette generated at step S12-8 and the silhouette generated at step S5-8 do not align. Consequently, pixel values of 1 in each difference image define positions where the silhouette of the scaled input 3D computer model is inconsistent with the silhouette 350–366 of the subject object 210 in the input image.

At step S12-12, the value of a variable $R_{best}$ indicating the current best rotation of the scaled input 3D computer model 150 is set to be the rotation of the input 3D computer model set at step S12-2. Similarly, the value of a variable $T_{best}$ indicating the current best position (translation) of the scaled input 3D computer model 150 is set to be the position defined at step S12-2. The value of a variable $E_{best}$ indicating the error in the registration of the input 3D computer model 150 with the input images 300–316 is set to be the sum of the number of pixels of value 1 in all of the difference images generated at step S12-10.

As will now be described, in subsequent processing, registration controller 70 performs processing to rotate and translate the scaled input 3D computer model 150 to reduce the value of $E_{best}$.

More particularly, at step S12-14, rotator 76 and translator 78 randomly rotate and translate the input 3D computer model 150 within the translation constraint set at step S12-4 and any rotation constraint (there being no rotation constraint for a first predetermined number of iterations of step S12-14, but, as will be described below, such a constraint being introduced after the first predetermined number of iterations have been performed).

At step S12-16, 3D model projector 74 projects the scaled input 3D computer model following its rotation and translation at step S12-14 into each input image 300–316.

At step S12-18, error calculator 82 processes each input image to compare the silhouette of the projected input 3D computer model with the silhouette 350–366 generated by image data segmenter 60, and generates a difference image from the silhouettes. The processing at step S12-18 corresponds to that of step S12-10 and accordingly will not be described again here.

At step S12-20, error calculator 82 calculates a registration error for the current rotation and translation of the input 3D computer model 150 (that is, the rotation and translation set at step S12-14). More particularly, as at step S12-12, error calculator 82 calculates the error as the sum of the number of pixels of value 1 in all of the difference images generated at step S12-18.

At step S12-22, error calculator 82 determines whether the current error determined at step S12-20 is less than the stored best error $E_{best}$.

If it is determined at step S12-22 that the current error is less than $E_{best}$, then at step S12-24, $R_{best}$ is set to the current rotation, $T_{best}$ is set to the current position and $E_{best}$ is set to the current error.

On the other hand, if it is determined at step S12-22 that the current error is not less than $E_{best}$, then step S12-24 is omitted.

At step S12-26, the value of the counter indicating the number of processing iterations is incremented by 1.

At step S12-28, the value of the counter is read to determine whether it is equal to a predetermined value, N1, which, in this embodiment, is set to 5,000.

If it is determined at step S12-28 that the value of the counter is equal to N1, then, at step S12-30, constraint calculator 80 sets a rotation constraint for subsequent rotations of the input 3D computer model 150 at step S12-14. More particularly, in this embodiment, constraint calculator 80 sets a rotation constraint of 10° so that, when step S12-14 is performed on subsequent iterations, the input 3D computer model 150 can only be rotated within ±10° of its current rotation. In this way, a rotation constraint is introduced when sufficient iterations of steps S12-4 to S12-32 have been carried out that the rotation of the scaled input 3D computer model should be approximately correct. Accordingly, accuracy is improved because rotation of the scaled input 3D computer model 150 in subsequent processing iterations is restricted, preventing large random rotations at step S12-14 which would not improve the accuracy of the registration.

On the other hand, if it is determined at step S12-28 that the value of the counter is less than or greater than the predetermined value N1, then step S12-30 is omitted.

At step S12-32, the value of the counter is read to determine whether it is less than a second predetermined value, N2, which, in this embodiment, is set to 10,000.

Steps S12-14 to S12-32 are repeated to randomly rotate and translate the input 3D computer model 150 and to test the resulting registration with the set of input images 300–316, until it is determined at step S12-32 that the number of iterations of this processing has reached the predetermined threshold N2.

At step S12-34, the stored values $R_{best}$ and $T_{best}$ are read and rotator 76 and translator 78 return the input 3D computer model 150 to the position and orientation defined by these values (these values representing the position and orientation generated in all iterations of step S12-14 which give the best registration of the input 3D computer model 150 with the registered set of input images 300–316).

FOURTH EMBODIMENT

A fourth embodiment of the present invention will now be described.

In the fourth embodiment, registration controller 70 performs processing to register the input 3D computer model 150 with the registered set of input images 300–316 automatically, without input from the user. However, the processing performed by registration controller 70 in the fourth embodiment is different to that in the third embodiment.

The components of the fourth embodiment and the processing operations performed thereby are the same as those in the first embodiment with the exception of the components of the registration controller 70 and the processing operations performed thereby at step S5-10 to register the input 3D computer model 150 with the input images 300–316. Accordingly, only these differences will be described below.

FIG. 13 shows the functional components of the registration controller 70 in the fourth embodiment.

Referring to FIG. 13, registration controller 70 includes surface modeller 72 (as in the first embodiment), and further includes a 3D model scaler 84, a mesh aligner 86, and a mesh registerer 88. The processing operations of these additional components will be described below.

FIG. 14 shows the processing operations performed by registration controller 70 at step S5-10 in the fourth embodiment to register the input 3D computer model 150 with the input images 300–316.

Referring to FIG. 14, at step S14-2, surface modeller 72 performs processing to generate a second 3D computer model of the subject object 210 which is registered with each of the input images 300–316. This processing is the same as the processing performed in step S7-2, described above in the first embodiment, and accordingly will not be described again here.

At step S14-4, 3D model scaler 84 scales the input 3D computer model 150 so that its scale corresponds to that of the coordinate system in which the input images 300–316 are registered (this processing being the same as the scaling operation at step S7-4 described previously in the first embodiment).

At step S14-6, mesh aligner 86 sets the scaled input 3D computer model 150 in the same coordinate system as the second 3D computer model generated at step S14-2 (and therefore in the same coordinate system as the registered input images 300–316), and approximately aligns the scaled input 3D computer model 150 and the second 3D computer model.

More particularly, in this embodiment, mesh aligner 86 aligns the polygon meshes of the two 3D computer models by calculating eigenvalues for each mesh defining the three principal axes of the data points in the mesh, and by calculating the centroid of the points in each data mesh. Mesh aligner 86 then aligns the two 3D computer models so that their centroids are at the same position, and so that the longest and second longest principal axes of the models are aligned.

At step S14-8, mesh registerer 88 accurately registers the scaled input 3D computer model 150 with the second 3D computer model generated at step S14-2 (and therefore accurately registers the input 3D computer model 150 with the registered set of input images 300–316). More particularly, in this embodiment, mesh registerer 88 performs processing at step S14-8 to register the two 3D computer models using an iterated closest-point algorithm, for example as described in section 4 of "Zippard Polygon Meshes From Range Images" by Turk and Levoy in Computer Graphics Proceedings, Annual Conference Series, 1994, ACM Siggraph, pages 311–318, ISBN 0-89791667-0.

Modifications and Variations

Many modifications and variations can be made to the embodiments described above within the scope of the claims.

For example, in the embodiments described above, the input image data comprises "still" images of the subject object 210. However, the input images may comprise frames of image data from a video camera.

In the embodiments described above, at step S5-4, data input by a user defining the intrinsic parameters of the camera is stored. However, instead, default values may be assumed for some, or all, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237–256, Azores 1993.

In the embodiments described above, the input images stored at step S5-4 comprise images of the subject object 210 on the photographic mat 34, and the processing by camera calculator 50 comprises processing to match features from the calibration pattern on the photographic mat 34 in the images with stored data defining the calibration pattern, so that the position and orientation of each input image is calculated relative to a reference position and orientation of the calibration pattern. However, instead, camera calculator 50 may perform processing to match features of the calibration pattern between images (instead of between an image and a stored pattern) to determine the relative positions and orientations of the input images. For example, a technique as described with reference to FIGS. 53 and 54 in PCT Application GB00/04469 (WO-A-01/39124) may be used. Alternatively, the input images stored at step S5-4 may comprise images of the subject object 210 alone, without the photographic mat, and camera calculator 50 may perform processing at step S5-6 to calculate the relative positions and orientations of the input images by matching features on the subject object 210 itself (rather than matching features in the calibration pattern), for example as described in EP-A-0898245. In addition, or instead, camera calculator 50 may calculate the relative positions and orientations of the input images at step S5-6 using matching features in the images identified by the user (for example, by pointing and clicking to identify the position of the same feature in different images).

In the first and fourth embodiments described above, surface modeller 72 generates the second 3D computer model of the subject object 210 by processing the input images using the silhouettes 350–366 generated by image data segmenter 60. However, instead, surface modeller 72 may generate the second 3D computer model from the input images using other processing techniques. For example, the technique described in EP-A-0898245 may be used.

In the first and second embodiments described above, images 410, 420 and 430 (FIG. 8) and images 510, 520 and 530 (FIG. 10) showing the silhouettes of the two 3D computer models are generated from orthogonal viewing directions (or as close to orthogonal as can be selected from the input images 300–316 in the case of the second embodiment). However, images 410, 420, 430, 510, 520 and 530 showing the silhouettes may be generated from non-orthogonal viewing directions.

In the second embodiment described above, at step S9-8, the user rotates and translates the scaled input 3D computer model 150 relative to the coordinate system in which the input images 300–316 are registered. Similarly, in the third embodiment at step S12-14, the scaled input 3D computer model 150 is rotated and translated within the coordinate system of the input images. However, instead, the coordinate system of the input images 300–316 may be translated and rotated relative to the scaled input 3D computer model 150, with the same effect.

In the second and third embodiments described above, at steps S9-2 and S12-2, the scaled input 3D computer model 150 is arranged in the coordinate system of the registered input images 300–316 so that the centre of its base is at the position corresponding to the centre of the calibration pattern on the photographic mat 34. As noted above, while this ensures that the position of the input 3D computer model is approximately correct, it has the disadvantage that the rotation of the input 3D computer model may be significantly incorrect. To address this disadvantage, a second 3D computer model of the subject object may be generated using the input images (for example, using the processing described with reference to the surface modeller 72 in the first embodiment), and processing may then be performed at step S9-2 and S12-2 to calculate and align the centroids and the two longest principal axes of the scaled input 3D computer model and the generated second 3D computer model (as described with reference to step S14-6 in the fourth embodiment above). By ensuring that the rotation of the input 3D computer model 150 is approximately correct as well as its position, the value of N2 in step S12-32 of the third embodiment may be reduced since fewer iterations of steps S12-14 to S12-32 will be necessary to register accurately the input 3D computer model 150 with the registered set of input images 300–316.

In the embodiments described above, processing is performed by a computer using processing routines defined by programming instructions. However, some, or all, of the processing could, of course, be performed using hardware.

What is claimed is:

1. A method of generating texture data for a three-dimensional computer model of a subject object, comprising:

recording a plurality of images of the subject object from different imaging positions and directions relative to the subject object, the plurality of images being independent of the three-dimensional computer model;

processing data defining the images to determine the locations of features in the images and to calculate the relative imaging positions and directions in dependence upon the locations of the features, thereby generating a registered set of images;

performing processing to change the relative position and orientation of the three-dimensional computer model of the subject object and the registered set of images to register the three-dimensional computer model with the registered set of images; and generating texture data for the three-dimensional computer model from the image data defining the images registered with the three-dimensional computer model.

2. Image processing apparatus operable to process image data to generate texture data for a three-dimensional computer model, comprising:

an image registration calculator operable to process image data defining a plurality of images of a subject object recorded at different imaging positions and orientations relative to the subject object, to calculate the relative imaging positions and orientations on the basis of the positions of features in the images so as to generate a registered set of images, the plurality of images being independent of the three-dimensional computer model;

an image-model registration calculator operable to register a three-dimensional computer model with the registered set of images; and a texture data generator operable to generate texture data for the three-dimensional computer model from the image data of the images registered with the three-dimensional computer model.

3. Apparatus according to claim 2, wherein the image registration calculator is operable to calculate the relative imaging positions and orientations of the images by calculating the imaging position and orientation of each image relative to a predetermined calibration pattern.

4. Apparatus according to claim 2, wherein the image registration calculator is operable to calculate the relative imaging positions and orientations of the images in dependence upon the positions of matching features in different images.

5. Apparatus according to claim 2, wherein the image registration calculator is operable to calculate the relative imaging positions and orientations in dependence upon features in the images identified by a user.

6. Apparatus according to claim 2, wherein the image registration calculator is operable to process the image data to detect features in different images, and to calculate the relative imaging positions and orientations in dependance upon the detected features.

7. Apparatus according to claim 2, wherein the image-model registration calculator comprises:

a three-dimensional computer model generator operable to generate a second three-dimensional computer model of the subject object, the second three-dimensional computer model being in registration with the registered set of images; and a computer model translator and rotator operable to change the relative position and orientation of the three-dimensional computer model and the second three-dimensional computer model to register the three-dimensional computer model with the registered set of images.

8. Apparatus according to claim 7, wherein the image-model registration calculator further comprises a silhouette data generator operable to generate data defining the silhouettes of the three-dimensional computer model and the second three-dimensional computer model in a plurality of images from different viewing positions and directions.

9. Apparatus according to claim 7, wherein the computer model translator and rotator is operable to change the relative position and orientation of the three-dimensional computer model and the second three-dimensional computer model in accordance with signals input by a user.

10. Apparatus according to claim 2, wherein the image-model registration calculator comprises:

a three-dimensional computer model projector operable to project the three-dimensional computer model into each of a plurality of the images;

an image data generator operable to generate image data for display showing the projection of the three-dimensional computer model relative to the subject object in each of the plurality of images into which the three-dimensional computer model is projected; and a position and orientation changer operable to change the relative position and orientation of the three-dimensional computer model and the registered set of images in accordance with signals input by a user;

the image data generator being arranged to generate updated image data for display as the relative position and orientation of the three-dimensional computer model and the registered set of images is changed.

11. Apparatus according to claim 10, wherein the image data generator is operable to generate image data for display showing the silhouette of the projected three-dimensional computer model relative to the silhouette of the imaged subject object in each of the plurality of images into which the three-dimensional computer model is projected.

12. Apparatus according to claim 2, wherein the image-model registration calculator comprises:

a three-dimensional computer model projector operable to project the three-dimensional computer model into each of a plurality of the images;

a projection comparer operable to compare the projection of the three-dimensional computer model with the image of the subject object in each of the plurality of images into which the three-dimensional computer model is projected, to calculate alignment differences thereof; and a registration calculator operable to change the relative position and orientation of the three-dimensional computer model and the registered set of images and to determine the registration position and orientation thereof in dependence upon the calculated alignment differences.

13. Apparatus according to claim 12, wherein the projection comparer is operable to compare the silhouette of the projected three-dimensional computer model and the silhouette of the image of the subject object in each of the plurality of images into which the three-dimensional computer model is projected, and to calculate the alignment differences in dependence upon the areas which lie within one, but not both, of the silhouettes.

14. A method of processing image data to generate texture data for a three-dimensional computer model, comprising:

processing image data defining a plurality of images of different views of a subject object to register the images, the plurality of images being independent of the three-dimensional computer model;

translating and rotating at least one of a three-dimensional computer model of the subject object and the registered images, to register the three-dimensional computer model with the images; and defining texture data for the three-dimensional computer model from the image data.

15. A method according to claim 14, wherein, to register the images, each image is processed to register it to a calibration pattern.

16. A method according to claim 14, wherein the images are registered relative to each other in dependence upon the positions of corresponding features in the images.

17. A method according to claim 14, wherein the images are registered in dependence upon features in the images identified by a user.

18. A method according to claim 14, wherein the image data is processed to detect corresponding features and wherein the images are registered in dependence upon the detected features.

19. A method according to claim 14, wherein the registration of the three-dimensional computer model with the images comprises:

processing the image data to generate a second three-dimensional computer model of the subject object, the second three-dimensional computer model being registered with the images; and translating and rotating at least one of the three-dimensional computer model and the second three-dimensional computer model to change the relative rotation and translation of the three-dimensional computer model and the images.

20. A method according to claim 19, wherein the registration of the three-dimensional computer model with the images further comprises generating data defining the silhouettes of the three-dimensional computer model and the second three-dimensional computer model in each of a plurality of images from different viewing positions and directions.

21. A method according to claim 19, wherein the translation and rotation is carried out in accordance with signals input by a user.

22. A method according to claim 14, wherein the registration of the three-dimensional computer model with the images comprises:

projecting the three-dimensional computer model into each of a plurality of the images;

generating image data for display to a user showing the projection of the three-dimensional computer model relative to the subject object in each of the plurality of images into which the three-dimensional computer model is projected;

translating and rotating at least one of the three-dimensional computer model and the registered images in accordance with signals input by the user; and generating updated image data for display to the user showing the results of the translation and rotation.

23. A method according to claim 22, wherein the image data generated for display comprises data showing the silhouette of the projected three-dimensional computer model relative to the silhouette of the imaged subject object in each of the plurality of images into which the three-dimensional computer model is projected.

24. A method according to claim 14, wherein the registration of the three-dimensional computer model with the images comprises:

translating and rotating at least one of the three-dimensional computer model and the registered images;

for different relative rotations and translations:

projecting the three-dimensional computer model into each of a plurality of the images; and comparing the projection of the three-dimensional computer model with image data of the subject object in each of the plurality of images into which the three-dimensional computer model is projected, to calculate registration errors thereof; and determining the registration of the three-dimensional computer model with the registered images in dependence upon the registration errors.

25. A method according to claim 24, wherein the silhouette of the projected three-dimensional computer model and the silhouette of the image of the subject object are compared in each of the plurality of images into which the three-dimensional computer model is projected, and the registration errors are calculated in dependence upon the size of non-overlapping portions of the silhouettes.

26. A method according to claim 14, further comprising generating a signal conveying the three-dimensional computer model and the texture data therefor.

27. A method according to claim 26, further comprising generating a recording of the three-dimensional computer model and the texture data by recording the signal either directly or indirectly.

28. Image processing apparatus for processing image data to generate texture data for a three-dimensional computer model, comprising:

image registration means for processing image data defining a plurality of images of a subject object recorded at different imaging positions and orientations relative to the subject object, to calculate the relative imaging positions and orientations on the basis of the positions of features in the images so as to generate a registered set of images, the plurality of images being independent of the three-dimensional computer model;

image-model registration means for registering a three-dimensional computer model with the registered set of images; and means for generating texture data for the three-dimensional computer model from the image data of the images registered with the three-dimensional computer model.

29. A method of generating texture data for a three-dimensional computer model of a subject object, comprising:

receiving data defining a plurality of images comprising different views of a subject object and data defining the relative positions and orientations of the images, the plurality of images being independent of the three-dimensional computer model;

receiving data defining a three-dimensional computer model of the subject object having a position and orientation undefined relative to the images;

performing processing in dependence upon the data defining the relative positions and orientations of the images to place the images and the three-dimensional computer model in the same three-dimensional space and to adjust the relative position and orientation of the three-dimensional computer model and the plurality of images; and generating texture data for the three-dimensional computer model from the images after the processing to adjust the relative position and orientation.

30. Apparatus operable to generate texture data for a three-dimensional computer model of a subject object, comprising:

a data receiver operable to receive data defining a plurality of images comprising different views of a subject object, data defining the relative positions and orientations of the images and data defining a three-dimensional computer model of the subject object having a position and orientation undefined relative to the images, the plurality of images being independent of the three-dimensional computer model;

an image-model position and orientation changer operable to perform processing in dependence upon the data defining the relative positions and orientations of the images to place the images and the three-dimensional computer model in the same three-dimensional space and to adjust the relative position and orientation of the three-dimensional computer model and the plurality of images; and a texture data generator operable to generate texture data for the three-dimensional computer model from the images after the processing to adjust the relative position and orientation.

31. Apparatus for generating texture data for a three-dimensional computer model of a subject object, comprising:

means for receiving data defining a plurality of images comprising different views of a subject object, data defining the relative positions and orientations of the images and data defining a three-dimensional computer model of the subject object having a position and orientation undefined relative to the images, the plurality of images being independent of the three-dimensional computer model;

means for performing processing in dependence upon the data defining the relative positions and orientations of the images to place the images and the three-dimensional computer model in the same three-dimensional space and to adjust the relative position and orientation of the three-dimensional computer model and the plurality of images; and means for generating texture data for the three-dimensional computer model from the images after the processing to adjust the relative position and orientation.

32. A method of generating texture data for a three-dimensional computer model of a subject object, comprising:

receiving data defining a plurality of images comprising different views of a subject object, the plurality of images being independent of the three-dimensional computer model;

performing processing to change the relative position and orientation of the three-dimensional computer model and the plurality of images without changing the relative positions and orientations of the plurality of images; and generating texture data for the three-dimensional computer model from the plurality of images in dependence upon the unchanged relative positions and orientations of the plurality of images and the changed relative position and orientation of the three-dimensional computer model and the plurality of images.

33. Apparatus operable to generate texture data for a three-dimensional computer model of a subject object, comprising:

a data receiver operable to receive data defining a plurality of images comprising different views of a subject object, the plurality of images being independent of the three-dimensional computer model;

a position and orientation changer operable to perform processing to change the relative position and orientation of the three-dimensional computer model and the plurality of images without changing the relative positions and orientations of the plurality of images; and a texture data generator operable to generate texture data for the three-dimensional computer model from the plurality of images in dependence upon the unchanged relative positions and orientations of the plurality of images and the changed relative position and orientation of the three-dimensional computer model and the plurality of images.

34. Apparatus for generating texture data for a three-dimensional computer model of a subject object, comprising:

means for receiving data defining a plurality of images comprising different views of a subject object, the plurality of images being independent of the three-dimensional computer model;

means for performing processing to change the relative position and orientation of the three-dimensional computer model and the plurality of images without changing the relative positions and orientations of the plurality of images; and means for generating texture data for the three-dimensional computer model from the plurality of images in dependence upon the unchanged relative positions and orientations of the plurality of images and the changed relative position and orientation of the three-dimensional computer model and the plurality of images.

35. A storage device storing instructions for causing a programmable processing apparatus to become configured as an apparatus as set out in claim 2, claim 28, claim 30, claim 31, claim 33 or claim 34.

36. A storage device storing instructions for causing a programmable processing apparatus to become operable to perform a method as set out in claim 14, claim 29 or claim 32.

37. A signal carrying instructions for causing a programmable processing apparatus to become configured as an apparatus as set out in claim 2, claim 28, claim 30, claim 31, claim 33 or claim 34.

38. A signal carrying instructions for causing a programmable processing apparatus to become operable to perform a method as set out in claim 14, claim 29 or claim 32.

* * * * *

UNITED STATES PATENT AND TRADEMARK OFFICE
CERTIFICATE OF CORRECTION

PATENT NO. : 6,975,326 B2
APPLICATION NO. : 10/287617
DATED : December 13, 2005
INVENTOR(S) : Adam Michael Baumberg et al.

It is certified that error appears in the above-identified patent and that said Letters Patent is hereby corrected as shown below:

On the title page, items:
[75] INVENTORS:

"Adam Michael Baumberg, Berkshire (GB); Alexander Ralph Lyons, Bershire (GB)" should read --Adam Michael Baumberg; Bracknell (GB); Alexander Ralph Lyons, Bracknell (GB)--.

[56] REFERENCES CITED insert:

FOREIGN PATENT DOCUMENTS, "JP   2000-163590   6/2000" should read --JP   2000-63590   6/2000--.

Signed and Sealed this

Eighth Day of August, 2006

JON W. DUDAS
*Director of the United States Patent and Trademark Office*